United States Patent [19]
Taguchi et al.

[11] Patent Number: 5,675,565
[45] Date of Patent: Oct. 7, 1997

[54] DATA REPRODUCTION METHOD AND APPARATUS

[75] Inventors: Masakazu Taguchi; Haruhiko Izumi, both of Kawasaki, Japan

[73] Assignee: Fujitsu Limited, Kawasaki, Japan

[21] Appl. No.: 618,585

[22] Filed: Mar. 20, 1996

[30] Foreign Application Priority Data

Jun. 27, 1995 [JP] Japan ..................... 7-161143

[51] Int. Cl.$^6$ ........................................ G11B 7/00
[52] U.S. Cl. ................ 369/59; 369/47; 369/50; 360/51; 360/46
[58] Field of Search ............... 369/59, 47, 48, 369/49, 50, 54, 58, 124; 360/48, 51, 46

[56] References Cited

U.S. PATENT DOCUMENTS 5,469,415  11/1995  Fujita et al. ................ 369/59 X
5,517,476  5/1996   Hayashi ...................... 369/59

FOREIGN PATENT DOCUMENTS 6225433   9/1994   Japan.

*Primary Examiner*—Muhammad N. Edun
*Attorney, Agent, or Firm*—Greer, Burns & Crain, Ltd.

[57] ABSTRACT

A system for reproducing data recorded in an optical disk as a signal obtained by modulating the data in accordance with a predetermined partial response characteristic, includes an optical head for reproducing the signal from the optical disk, a VCO for generating a clock, an A/D converter for obtaining a sampling value from the reproduction signal in synchronism with the clock, a maximum likelihood decoder for detecting a maximum likelihood decode data on the basis of the sampling value in synchronism with the clock, a demodulator for demodulating the decode data from the maximum likelihood decoder, wherein the maximum likelihood decoder includes a phase error detecting unit for detecting a phase error between the clock and a point of time when the reproduction signal is sampled, and a phase error correcting unit for correcting the detected phase error.

16 Claims, 20 Drawing Sheets $$A_k = (a_{k1}, a_{k2}) \neq (0,0)(1,1)$$
$$M_k = (m_{k1}, m_{k2})$$
$$d_k = (a_{k1} \cdot \overline{a_{k2}} \cdot \overline{m_{k1}} \cdot m_{k2})$$
$$+ (\overline{a_{k1}} \cdot a_{k2} \cdot m_{k1} \cdot \overline{m_{k2}})$$

OCCURRENCE OF PHASE ERROR
IN PLUS DIRECTION

OCCURRENCE OF PHASE ERROR
IN MINUS DIRECTION

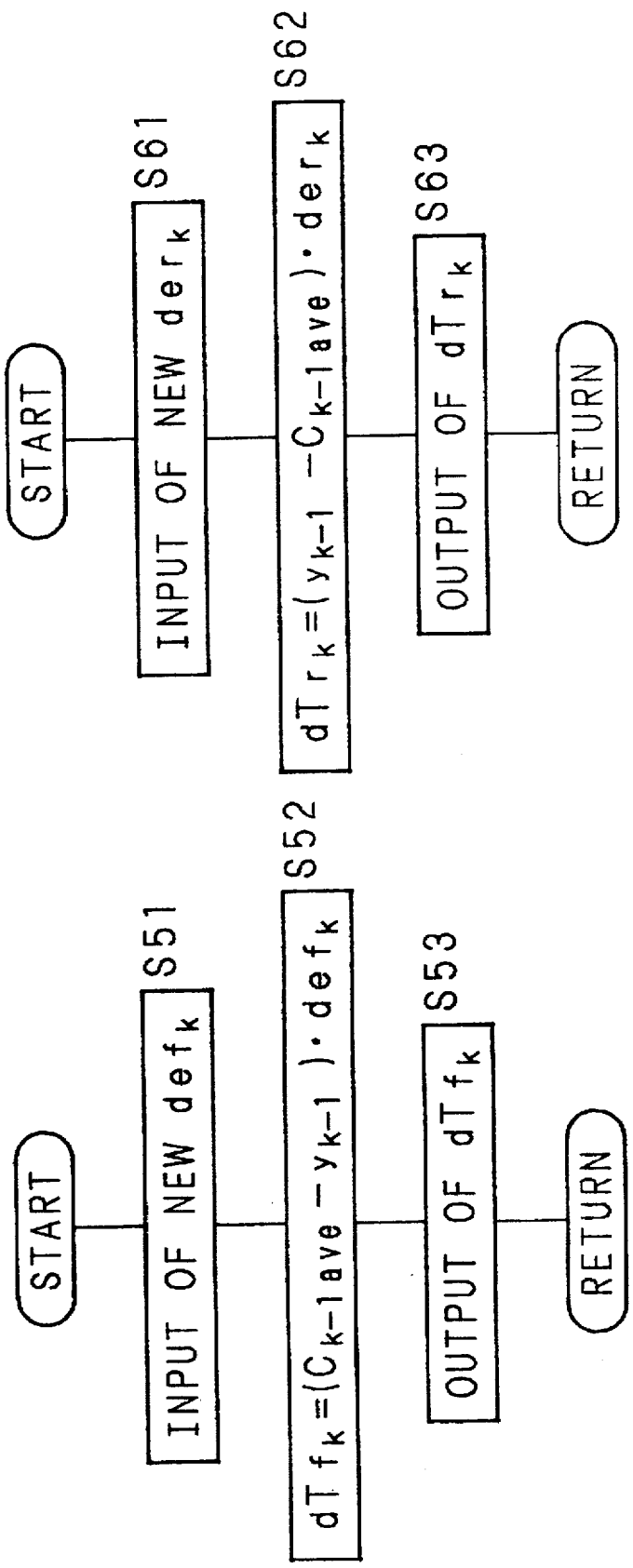

NORMAL CASE

CASE OF ERROR OCCURRENCE

CASE OF VCO VOLTAGE DRIFT a: MERGE DETERMINATION  b: DETECTION DATA
c: PHASE ERROR SIGNAL

FIG. 13

| $Po_{k-1}$ | $Po_k$ | $Po_{k-1} \times Po_k$ | PHASE ERROR CHANGE |
|---|---|---|---|
| 0 | 0 | 0 | NONE |
| 0 | 1 | 0 | NONE → PLUS |
| 0 | −1 | 0 | NONE → MINUS |
| 1 | 0 | 0 | PLUS → NONE |
| 1 | 1 | 1 | SAME POLARITY |
| 1 | −1 | −1 | DIFFERENT POLARITY |
| −1 | 0 | 0 | MINUS → NONE |
| −1 | 1 | −1 | DIFFERENT POLARITY |
| −1 | −1 | 1 | SAME POLARITY |

$$\begin{pmatrix} 0 : \text{NO PHASE ERROR} \\ 1 : \text{PLUS PHASE ERROR} \\ -1 : \text{MINUS PHASE ERROR} \end{pmatrix}$$

FIG. 17A

FIRST SELECTOR 256

| $def_k$ | $der_k$ | SELECTION OF INPUT TERMINAL |
|---|---|---|
| 0 | 0 | A |
| 1 | 0 | B |
| 0 | 1 | C |

FIG. 17B

SECOND SELECTOR 259

| OUTPUT OF AND CIRCUIT 266 | SELECTION OF INPUT TERMINAL |
|---|---|
| 0 | D |
| 1 | E |

FIG. 17C

THIRD SELECTOR 260

| OUTPUT OF AND CIRCUIT 266 | SELECTION OF INPUT TERMINAL |
|---|---|
| 0 | F |
| 1 | G |

FIG. 17D

FOURTH SELECTOR 267

| OUTPUT OF AND CIRCUIT 266 | SELECTION OF INPUT TERMINAL |
|---|---|
| 0 | I |
| 1 | H |

FIG. 18

| $P_{ok-1}$ | $P_{ok}$ | $P_{ok-1} \times P_{ok}$ | PHASE ERROR CHANGE |
|---|---|---|---|
| ed=00 | ed=00 | ed=00 | NONE |
| 00 | 01 | 00 | NONE → PLUS |
| 00 | 11 | 10 | NONE → MINUS |
| 01 | 00 | 00 | PLUS → NONE |
| 01 | 01 | 01 | SAME POLARITY |
| 01 | 11 | 11 | DIFFERENT POLARITY |
| 11 | 00 | 10 | MINUS → NONE |
| 11 | 01 | 11 | DIFFERENT POLARITY |
| 11 | 11 | 01 | SAME POLARITY |

$\begin{pmatrix} 00, 10: \text{NO PHASE ERROR} \\ 01: \text{PLUS PHASE ERROR} \\ 11: \text{MINUS PHASE ERROR} \end{pmatrix}$

DATA REPRODUCTION METHOD AND APPARATUS

BACKGROUND OF THE INVENTION

1. Field of the Invention

The present invention relates to a method and apparatus for reproducing data stored in an optical disk.

2. Description of Related Art

Recent accelerating development of multi-media is spotlighting the utility of optical disks as external storage devices, and in line with an increase in the amount of record data, each disk is required to have a large storage capacity. The storage of data in an optical disk is closely related to the storage density therein, and in order to increase the storage density, an edge-position recording system, wherein record data correspond to both ends of record pit, is in common use.

As a method for reproducing record data recorded under the edge-position recording system, a partial response maximum likelihood (PRML) data reproduction method is used. This PRML method uses a maximum likelihood method (Viterbi decoding) so as to demodulate the information modulated in accordance with a partial response characteristic and recorded in an optical disk. First, a signal is obtained after it is subjected to run-length limitation and demodulated in accordance with a partial response characteristic, and is recorded in an optical disk. A reproduction signal is obtained from the Optical disk, and sampled by an analog/digital converter (A/D converter). The transition of a maximum likelihood signal is fixed from the sampling values in accordance with a predetermined algorithm. A reproduction data is determined on the basis of the fixed transition of the signal, and from the determined reproduction data the original record data is demodulated.

The inventors have already completed a maximum likelihood decoding system, which is filed in Japanese Patent Application No. 6-225433. Now, referring to FIG. 1, the system will be described. The reference numeral 1 designates an optical disk which stores record data modulated in accordance with a partial response class 1 (PR (1, 1) in which, for example, 1/7 run-length limitation is made. Under the optical disk 1 is provided an optical head 2 from which a reproduction signal is obtained corresponding to the record data in the optical disk 1. The optical head 2 outputs the reproduction signal to an amplifier 3 which amplifies the input reproduction signal and outputs it to an equalizer 4. The equalizer 4 shapes the waveform of the amplified reproduction signal and delivers it to a low-pass filter (LPF) 5 which cuts off a high-frequency portion of the reproduction signal beyond a predetermined frequency and outputs a low-frequency portion to an A/D converter 6. The A/D converter 6 samples the shaped reproduction signal, and outputs the sampling value to a maximum likelihood decoder 7.

The maximum likelihood decoder 7 generates a maximum likelihood decode data $d_k$ and a phase error data $dT_k$ (described below), and outputs the maximum likelihood decode data $d_k$ to a demodulator 8, and the phase error data $dT_k$ to a D/A converter 11. The demodulator 8 demodulates the maximum likelihood decode data $d_k$ so as to relieve the 1/7 run-length limitation and generates a final reproduction signal.

The D/A converter 11 converts the phase error data $dT_k$ into a phase error signal (rectangular waveform signal), and delivers it to a low-pass filter (LPF) 12. The LPF 12 converts the phase error signal to a voltage level, and outputs it to a voltage control oscillator (VCO) 13. The VCO 13 generates a reference clock signal which is a clock signal identical to a synchronous signal used for data recording, and after controlling the phase of the reference clock signal in accordance with the input voltage level, outputs the controlled clock signal to the A/D converter 6 and the maximum likelihood decoder 7. The A/D converter 6 and the maximum likelihood decoder 7 are operated in synchronism with the clock signal from the VCO 13.

FIG. 2 shows the internal structure of the maximum likelihood decoder 7 which includes a merge determining unit 21, a central value calculating unit 22, a reference value calculating unit 23, a merge detecting unit 24 and a phase error detecting unit 25. Prior to describing each part, the merge is defined as follows:

The maximum likelihood decoder 7 decodes a sampling value determined by the A/D converter 6 into a record data. When the decoder 7 detects a maximum likelihood data from an input signal, it fixes the transition path of a maximum likelihood data around the detected data, and fixes the data on the path as a record data. The record data corresponds to the characteristic of the partial response class 1. Therefore, between the record data "+1" and "0", the data transition path from "1" to "1", from "0" to "0", from "1" to "0", and "0" to "1" can be respectively obtained. A data transition containing the data transition path from "1" to "1" is defined as +merge. A data transition containing the data transition path from "0" to "0" is defined as −merge. A data transition containing the data transition path from "0" to "1" or from "1" to "0" is defined as no merge.

FIGS. 3 to 7 are respectively flowcharts showing the sequence of operating the merge determining unit 21, the central value calculating unit 22, the reference value calculating unit 23, the merge detecting unit 24 and the phase error detecting unit 25.

The merge determining unit 21 judges the merge of the sampling data $y_k$ by using a sampling data $y_k$ from the A/D converter 6 and a reference value $\Delta_k$ from the reference value calculating unit 23, and outputs the determination value $M_k$. The merge determining unit 21 processes in accordance with the flowchart of FIG. 3. When a new sampling data (input data) $y_k$ is inputted to the merge determining unit 21 from the A/D converter 6 (Step S1), $Z_k$ is calculated as $Z_k = y_k - \Delta_k$ (Step S2). +merge, −merge and no merge are respectively judged depending upon the value of $Z_k$ (Step S3). When it is −merge ($Z_k < -1$), the determination value $M_k = (m_{k1}, m_{k2}) = 10$ is set (Step S4). When it is no merge ($-1 \leq Z_k \leq 1$), the determination value $M_k = 00$ is set (Step S5). When it is +merge ($Z_k > 1$), the determination value $M_k = 01$ is set (Step S6). Then, the set determination value $M_k$ is outputted to the reference value calculating unit 23 and the merge detecting unit 24 (Step S7).

The central value calculating unit 22 calculates a central value $C_{kave}$, which is the central level of the reproduction signal, by using a sampling data $y_k$ from the A/D converter 6 and $Z_k$ from the merge determining unit 21. The central value calculating unit 22 is operated in accordance with the flowchart of FIG. 4. When a new sampling data (input data $y_k$) is inputted from the A/D converter 6 (Step S11), the value of $Z_k$ is judged (Step S12), and the central value data $C_{kd}$ is calculated depending upon the value of In the case of $Z_k < -2$, the central value data $C_{kd}$ is calculated in accordance with $C_{kd} = y_k + 2$ (Step S13). In the case of $-2 \leq Z_k \leq 2$, the central value data $C_{kd}$ is calculated in accordance with $C_{kd} = C_{k-lave}$ (Step S14). In the case of $Z_k > 2$, the central value data $C_{kd}$ is calculated in accordance with $C_{kd} = y_k - 2$ (Step S15). In the case of $Z_k>2$, since the input data $y_k$ is certainly in the state of +merge, the central value $C_{kd}$ is determined by deducting an ideal amplitude value "2" from the input data $y_k$. In the case of $Z_k<-2$, since the input data $y_k$ is certainly in the state of merge, the central value $C_{kd}$ is determined by deducting an ideal negative amplitude value "-2" from the input data $y_k$. The case of $-2 \leq Z_k \leq 2$ is a case where since it is impossible to judge it either as +merge or −merge (including no merge), the previous calculated central value $C_{k-lave}$ is used as the central value data $C_{kd}$. In this way, the current central value $C_{kave}$ is calculated in accordance with $C_{kave}=[(n-1)C_{k-lave}+C_{kd}]/n$ (Step S16). The central value $C_{kave}$ obtained in this way corresponds to an average value of n number of central value data $C_{kd}$. A curve depicted with the central values $C_{kave}$ represents the central level of the reproduction signal.

The reference value calculating unit 23 calculates a reference value $\Delta_{k+1}$ by using a sampling data $y_k$ from the A/D converter 6, a determination value $M_k$ from the merge determining unit 21, and a central value $C_{kave}$ from the central value calculating unit 22. The reference value calculating unit 23 processes in accordance with the flowchart of FIG. 5. When a new sampling data (input data) $y_k$ is inputted (Step S21), the reference value calculating unit 23 judges the determination value $M_k$ (Step S22), and calculates a reference value $\Delta_{k+1}$ in accordance with the determination value $M_k$. In the case of $M_k=10$ ($Z_k<-1$: −merge), the reference value $\Delta_{k+1}=2C_{kave}-y_k-1$ is calculated (Step S23), and in the case of $M_k=00$ ($-1 \leq Z_k \leq 1$: no merge), the reference value $\Delta_{k+1}=2C_{kave}-\Delta_k$ is calculated (Step S24). In the case of $M_k=01$ ($Z_k>1$: +merge), the reference value $\Delta_{k+1}=2C_{kave}-y_k+1$ is calculated (Step S25). The calculated reference value $\Delta_{k+1}$ is outputted to the merge determining unit 21 (Step S26).

The merge detecting unit 24 detects a change in the sampling data $y_k$ from −merge to +merge, and from +merge to −merge on the basis of the determination value $M_k$ from the merge determining unit 21. The merge detecting unit 24 processes in accordance with the flowchart of FIG. 6. When a new determination value $M_k$ is inputted from the merge determining unit 21 (Step S31), the merge detecting unit 24 defines a variable $A_k=(a_{k1}, a_{k2}) \neq (0,0), (1,1)$, and judges the value of $M_k$ (Step S32). In the case of $M_k=A_k$ (+merge or −merge with no change) or $M_k=00$ (no merge), $A_{k+1}=A_k$ is maintained without changing the previous variable $A_k$ (Step S33). In the case of $M_k \neq A_k$ (a change from +merge to −merge or a change from −merge to +merge), $A_{k+1}=M_k$ is maintained by setting the variable $A_{k+1}$ to the previous determination value $M_k$ (Step S34). Then, a maximum likelihood decode data $d_k$ is calculated by the following equation (1), and the result is outputted to the demodulator 8 (Step S35):

$$d_k = def_k + der_k \quad (1)$$
$$= (a_{k1} \cdot \overline{a_{k2}} \cdot \overline{m_{k1}} \cdot m_{k2}) + (\overline{a_{k1}} \cdot a_{k2} \cdot m_{k1} \cdot \overline{m_{k2}})$$

When no merge, +merge or −merge is maintained without any change, $d_k=0$ is obtained from the equation (1). If a sampling data $y_k$ changes from +merge to −merge or from −merge to +merge, $d_k=1$ is obtained from the equation (1).

The phase error detecting unit 25 calculates a phase error data $dT_k$ on the basis of a sampling data $y_k$ from the A/D converter 6, a central value $C_{kave}$ from the central value calculating unit 22, and a maximum likelihood decode data $d_k$ from the merge detecting unit 24. The phase error detecting unit 25 processes in accordance with the flowchart of FIG. 7. When a new maximum likelihood decode data $d_k$ [a leading-edge maximum likelihood decode data $def_k$ ("1" or "0") and a trailing-edge maximum likelihood decode data $der_k$ ("1" or "0")] is inputted from the merge detecting unit 24 by a clock timing k (Step S41), the phase error detecting unit 25 calculates the leading-edge phase error data $dTf_k$ by putting the central value $C_{k-lave}$ the sampling data $y_{k-1}$ and the leading-edge maximum likelihood decode data $def_k$ in $dTf_k=(C_{k-lave}-y_{k-1}).def_k$, and also calculates the trailing-edge phase error data $dTr_k$ by putting the central value $C_{k-lave}$, the sampling data $y_{k-1}$, and the trailing-edge maximum likelihood decode data $der_k$ in $dTr_k=(y_{k-1}-C_{k-lave}).der_k$ (Step S42), the central value $C_{k-lave}$ and the sampling data $y_{k-1}$ being obtained by the previous clock timing k−1. The leading-edge maximum likelihood decode data $def_k$ becomes "1" at the leading-edge point (the ascending point), and as a result, the leading-edge phase error data $dTf_k$ corresponds to a difference between the central value of the reproduction signal and the sampling data at the leading-edge point. Likewise, the trailing-edge phase error data $dTr_k$ corresponds to a difference between the central value of the reproduction signal and the sampling data at the trailing-edge point (the descending point). The phase error data $dT_k$ is obtained by adding the leading-edge phase error data $dTf_k$ to the trailing-edge phase error data $dTr_k$ (Step S43), and the resulting phase error data $dT_k$ is outputted to the D/A converter 11 (Step S44).

The operation will be described. A reproduction signal having a partial response characteristic corresponding to a maximum likelihood decoding obtained by the optical head 2 from the optical disk 1 is delivered to the A/D converter 6 through the amplifier 3, the equalizer 4 and the LPF 5. The A/D converter 6 obtains a sampling value of the reproduction signal in synchronism with a clock signal from the VCO 13, and outputs it to the maximum likelihood decoder 7 where the merge determining unit 21, the central value calculating unit 22, the reference value calculating unit 23 and the merge detecting unit 24 process in accordance with the flowchart of FIGS. 3, 4, 5 and 6, respectively, and produces a maximum likelihood decode data $d_k$. The maximum likelihood decode data $d_k$ is outputted to the demodulator 8. The maximum likelihood decoder 7 is operated in synchronism with a clock signal from the VCO 13.

In the maximum likelihood decoder 7 the phase error detecting unit 25 processes in accordance with the flowchart of FIG. 7, and produces a phase error data $dT_k$ and outputs it to the D/A converter 11. The phase error data $dT_k$ is converted into a phase error signal by the D/A converter 11. The phase error signal is converted into a voltage level by the LPF 12. The VCO 13 adjusts the phase of the reference clock signal in accordance with the voltage level, and delivers the adjusted clock signal to the A/D converter 6 and the maximum likelihood decoder 7.

FIGS. 8A and 8B are views each exemplifying the generation of the phase error control voltage. FIG. 8A shows a case where a phase error $d_\tau$ between the "phase of an actual clock signal" (●) and the "ideal sampling point of the reproduction signal" (○)) is positive (+). In this case, the D/A converter 11 outputs a phase error signal representing a positive (+) amplitude which matches with the phase error $d_\tau$ at every timing corresponding to the edge points, and the phase error signal is filtered by the LPF 12, and becomes an input signal to the VCO 13. FIG. 8B shows a case where a phase error $d_\tau$ between the "phase of an actual clock signal" (●) and the "ideal sampling point of the reproduction signal" (○) is negative (−). In this case, the D/A converter 11 outputs a phase error signal representing a negative (−) amplitude which matches with the phase error $d_\tau$ at every timing corresponding to the edge points, and the phase error signal is filtered by the LPF 12, and becomes an input signal to the VCO 13. In this way a phase error signal at the point of a maximum likelihood decode data is detected through the maximum likelihood decoding, and an error is corrected by using the phase error.

Synchronizing with the clock signal, the A/D converter 6 executes the sampling, and the maximum likelihood decoder 7 detects the maximum likelihood decode data $d_k$ and the phase error data $dT_k$. The maximum likelihood decode data $d_k$ is delivered to the demodulator 8 whereby it is relieved of the 1/7 run-length limitation, and the original record data is reproduced.

The structure shown in FIG. 1 is a reproduction system in which a leading-edge (corresponding to the ascending edge of a reproduction signal) and a trailing-edge (corresponding to the descending edge of a reproduction signal) are detected in a mixing stage. In contrast, another reproduction system independently detects signals corresponding to the leading-edge and trailing-edge of a reproduction waveform, and generates a clock Signal independently reproduced from each detection, and data is reproduced on the basis of each clock signal. This independent detection system is also proposed in Japanese Patent Application No. 6-225433.

FIG. 9 is a view illustrating the structure of the independent data reproduction system, wherein like reference numerals designate like elements and components to those in FIG. 1. An A/D converter 6a, a maximum likelihood decoder 7a, a D/A converter 11a, an LPF 12a and a VCO 13a constitute a leading-edge maximum likelihood data detecting system. An A/D converter 6b, a maximum likelihood decoder 7b, a D/A converter 11b, an LPF 12b and a VCO 13b constitute a trailing-edge maximum likelihood data detecting system. The A/D converters 6a, 6b, the D/A converters 11a, 11b, the LPFs 12a, 12b and the VCOs 13a, 13b have substantially the same structure as that of the A/D converter 6, the D/A converter 11, the LPF 12 and the VCO 13 shown in FIG. 1, respectively.

The maximum likelihood decoders 7a and 7b have the same structure as that of the maximum likelihood decoder 7 shown in FIG. 1 (Refer to FIG. 2). In the example shown in FIG. 9 the maximum likelihood decoder 7a for the leading-edge and the maximum likelihood decoder 7b for the trailing-edge are independently provided. As a result, the leading-edge maximum likelihood decoder 7a outputs a leading-edge maximum likelihood decode data $def_k$ from the merge detecting unit 24, and a leading-edge phase error data $dTf_k$ from the phase error detecting unit 25. The trailing-edge maximum likelihood decoder 7b outputs a trailing-edge maximum likelihood decode data $der_k$ from the merge detecting unit 24, and a trailing-edge phase error data $dTr_k$ from the phase error detecting unit 25.

FIGS. 10A and 10B are flowcharts illustrating the sequence of operating the phase error detecting units 25 for the leading-edge and the trailing-edge, respectively. As shown in FIG. 10A, when a new leading-edge maximum likelihood decode data $def_k$ is inputted (Step S51), the leading-edge phase error detecting unit 25 calculates a leading-edge phase error data $dTf_k$ by using the equation $dTf_k = (C_{k-lave} - y_{k-1}).def_k$ (Step S52), and outputs the calculated value $dTf_k$ to the D/A converter 11a (Step S53). As shown in FIG. 10B, when a new trailing-edge maximum likelihood decode data $der_k$ is inputted (Step S61), the trailing-edge phase error detecting unit 25 calculates a trailing-edge phase error data $dTr_k$ by using the equation $dTr_k = (y_{k-1} - C_{k-lave}).der_k$ (Step S62), and outputs the calculated value $dTr_k$ to the D/A converter 11b (Step S63).

The leading-edge maximum likelihood decode data $def_k$ and the trailing-edge maximum likelihood decode data $der_k$ from the maximum likelihood decoders 7a and 7b are inputted to a synthesizer 9, which is constituted with, for example, an FIFO (First-In First-Out) memory, wherein the leading-edge maximum likelihood decode data $def_k$ synchronizes with a leading-edge clock signal from the VCO 13a, and the trailing-edge maximum likelihood decode data $der_k$ synchronizes with a clock signal from the VCO 13b. The leading-edge maximum likelihood decode data $def_k$ and the trailing-edge maximum likelihood decode data $der_k$ are alternately read out from the synthesizer 9 while they synchronize with either the leading-edge clock signal or the trailing-edge clock signal, and become a synthesized maximum likelihood decode data $d_k$. The maximum likelihood decode data $d_k$ is demodulated into the original record signal by the demodulator 8 similarly to the example shown in FIG. 1.

The reproduction system proposed in Japanese Patent Application No. 6-225433 determines the transition of the data to be reproduced on the basis of the relative level association between the sampling value $y_k$ and the reference value $A_k$ calculated by using the central value representing a change in the reproduction signal. As a result, the data is accurately reproduced irrespective of any change in the reproduction signal. The phase error detecting unit 25 of the maximum likelihood decoder 7 (7a, 7b), the D/A converter 11 (11a, 11b), the LPF 12 (12a, 12b) and the VCO 13 (13a, 13b) constitute a PLL circuit, and generates a clock signal in exact synchronism with the reproduction signal.

As to the production of a clock signal used for operating the A/D converter and the maximum likelihood decoder, there is a further method which produces a clock signal by slicing an analog reproduction signal in a binary circuit and passing the resulting synchronous signal through a PLL circuit. However, this method has a problem of a phase shift in the clock signal to be delivered to the A/D converter and the maximum likelihood decoder caused by a variation in the slicing level or a delay in the circuit elements, thereby preventing A/D conversion in an optimum phase.

In the first-mentioned example where a phase error is detected from the sampling data, the maximum likelihood decode data, and the central value of the reproduction signal, and the PLL circuit using the phase error compensates a phase shift. In this way the phase of a clock signal is adjusted such that an error between the phase of the clock signal and a sampling point of the reproduction signal is negated. As a result, even if any error occurs between the clock signal and the sampling point of the reproduction signal, owing to a time lag in the circuits, the phase error is corrected, thereby securing an accurate reproduction of data.

However, under this reproduction system if any error occurs owing to noise, edge shift or faulty medium at the maximum likelihood decoding time, the error unfavorably affects the synchronous clock signal. FIGS. 11A to 11C illustrate examples of the problems arising therefrom. FIG. 11A shows a normal cancellation of the phase error of the clock signal by the phase error signal. As shown in FIG. 11A, the phase error signal increases by the clock shift, and thereafter, it diminishes as the phase shift is compensated. FIG. 11B shows the occurrence of a detection error. If a detection error occurs, the detected maximum likelihood decode data shifts by one bit, the phase error signal is generated in opposite phase. If the phase error signal in opposite phase is large, the control voltage in the VCO is drifted, whereby the clock signal is shifted and the error propagation occurs.

SUMMARY OF THE INVENTION

It is a main object of the present invention to provide a data reproduction method and apparatus for am optical disk which, even if any error occurs during the maximum likelihood decoding, can prevent the phenomenon that the error affects a synchronous clock signal to operate an A/D converter and a maximum likelihood decoder so as to propagate the maximum likelihood decode error.

The data reproduction method according to the present invention is a method for reproducing the data recorded in an optical disk as a signal obtained by modulating the data in accordance with a predetermined partial response characteristic, the method includes the sequence of reproducing a signal from the optical disk, generating a synchronous clock, obtaining a sampling value from the reproduced signal in synchronism with the synchronous clock, detecting a maximum likelihood decode data on the basis of the sampling value in synchronism with the synchronous clock, detecting any phase error between the synchronous clock and a point of time when the reproduction signal is sampled, and correcting the detected phase error.

In the present invention a phase error between the phase of a synchronous clock and a point of time when a reproduction signal is sampled is detected, and if no error occurs in the maximum likelihood decoding, the phase error signal is used as it is, and if an error occurs, a corrected phase error signal is used, so as to compensate a phase shift of a synchronous clock which controls the operation of obtaining a sampling value and a maximum likelihood decode data. According to the phase error signal detecting system of the present invention, even if a detected maximum likelihood decode data is erroneous, the phase shift of the synchronous clock is automatically corrected, thereby reducing the possibility of error propagation and increasing an error rate. In this case, the occurrence of any error at the maximum likelihood decoding time is determined on the basis of the polarity and/or amplitude of the phase error, that is, the necessity of correcting a phase error is determined. It is also possible to detect a phase error by combining an ascending edge (leading-edge) and a descending edge (trailing-edge) or alternatively to detect the leading-edge phase error and the trailing-edge phase error independently.

The above and further objects and features of the invention will more fully be apparent from the following detailed description with the accompanying drawings.

BRIEF DESCRIPTION OF THE DRAWINGS

FIGS. 10A and 10B are flowcharts each showing the prior art sequence of leading-edge phase and trailing-edge phase detection by a phase error detecting unit;

FIG. 13 is a table showing the determination of the polarity of a phase error;

FIGS. 17A to 17D inclusive are views showing the patterns selected by a selector of the phase error detecting unit;

FIG. 18 is a table showing the logical values of the determined polarities of a phase error;

DESCRIPTION OF THE PREFERRED EMBODIMENTS

The present invention will be described more particularly by way of example by reference to the accompanying drawings:

Embodiment 1

Figure 1:
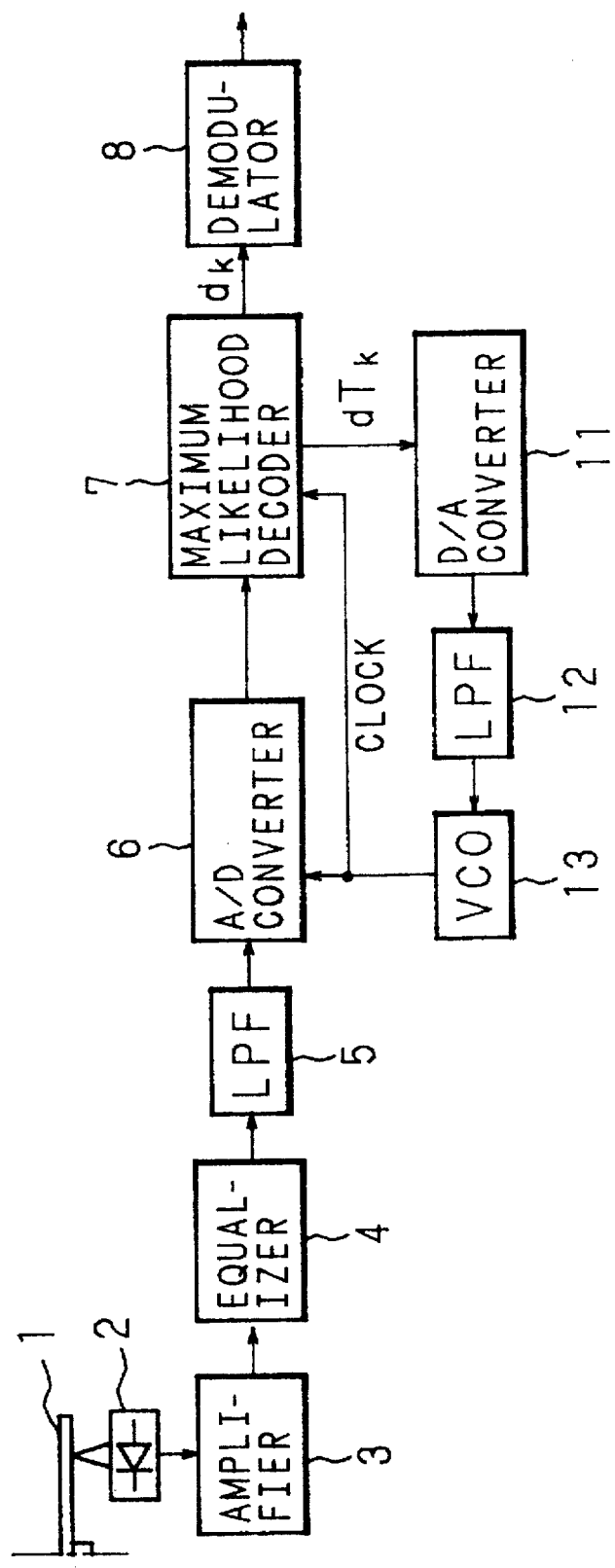
FIG. 1 is a block diagram illustrating a reproduction system (a leading-edge and trailing-edge combination type) in an optical disk according to a maximum likelihood decoding method.
Figure 2:
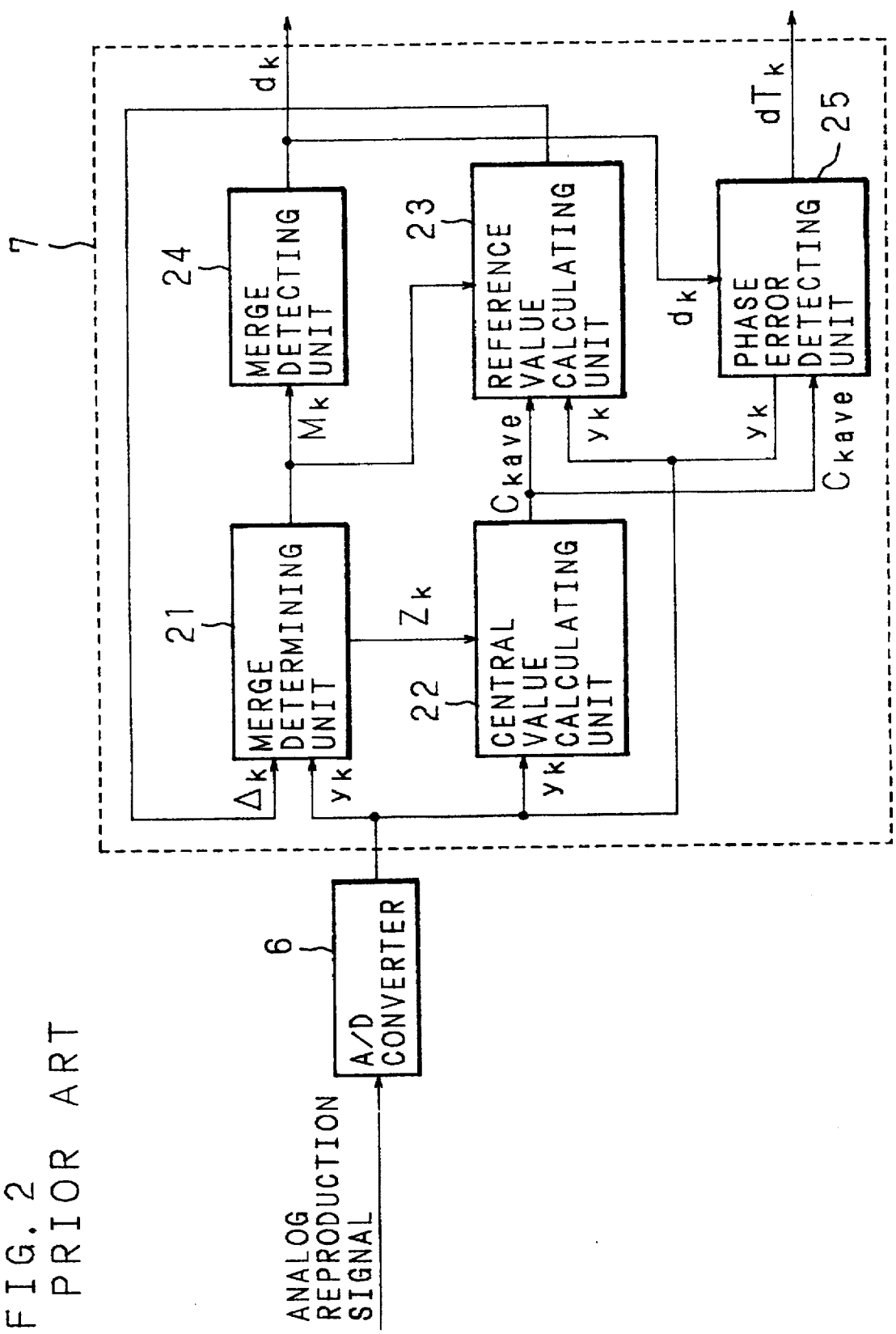
FIG. 2 is a block diagram illustrating the internal structure of a maximum likelihood decoder.

The entire structure of a data reproduction apparatus according to Embodiment 1 (leading-edge and trailing-edge combination detection system) and the internal structure of the maximum likelihood decoder 7 used therein are basically the same as those shown in FIGS. 1 and 2, which are filed in Japanese Patent Laid-Open Publication No. 6-225433. The differences are in the sequence of operating a maximum likelihood decoder 7, especially the phase error detecting unit 25.

The optical disk 1 stores a record data which is subjected to a ½ run-length limitation and is modulated in accordance with a partial response class 1 characteristic. Under the optical disk 1 is provided an optical head 2 for obtaining a reproduction signal corresponding to the record data. The optical head 2 outputs the reproduction signal to an amplifier 3 which amplifies it and outputs the amplified reproduction signal to an equalizer 4. The equalizer 4 shapes the waveform of the amplified reproduction signal and delivers it to an LPF 5 which cuts off a high-frequency portion of the reproduction signal beyond a predetermined frequency, and outputs a low-frequency portion of the reproduction signal to an A/D converter 6. The A/D converter 6 samples the shaped reproduction signal and outputs the sampling data $y_k$ to the maximum likelihood decoder 7.

The maximum likelihood decoder 7 generates a maximum likelihood decode data $d_k$ and a phase error data $dT_k$, and outputs the maximum likelihood decode data $d_k$ to a demodulator 8, and the phase error data $dT_k$ to a D/A converter 11. The demodulator 8 demodulates the maximum likelihood decode data $d_k$ so as to relieve the 1/7 run-length limitation. In this way a final reproduction signal is obtained.

The D/A converter 11 converts the phase error data $dT_k$ into a phase error signal (rectangular waveform signal), and delivers it to an LPF 12 which, after converting it to a voltage level, outputs it to a VCO 13. The VCO 13 generates a reference clock signal which is a clock signal identical to a synchronous signal used for data recording, and controls the phase of the reference clock signal in accordance with the input voltage level. The controlled clock signal is outputted to the A/D converter 6 and the maximum likelihood decoder 7. The A/D converter 6 and the maximum likelihood decoder 7 are operated in synchronism with the clock signal.

As described above by reference to FIG. 2, the maximum likelihood decoder 7 includes the merge determining unit 21, central value calculating unit 22, reference value calculating unit 23, merge detecting unit 24, and phase error detecting unit 25. The merge determining unit 21, the central value calculating unit 22, the reference value calculating unit 23, and the merge detecting unit 24 are basically operated in the same manner as in the prior art referred to above. The phase error detecting unit 25 is operated in a different manner.

FIGS. 3, 4, 5, 6, and 12 are flowcharts showing the sequences of operating the merge determining unit 21, the central value calculating unit 22, the reference value calculating unit 23, the merge detecting unit 24 and the phase error detecting unit 25, respectively.

Figure 3:
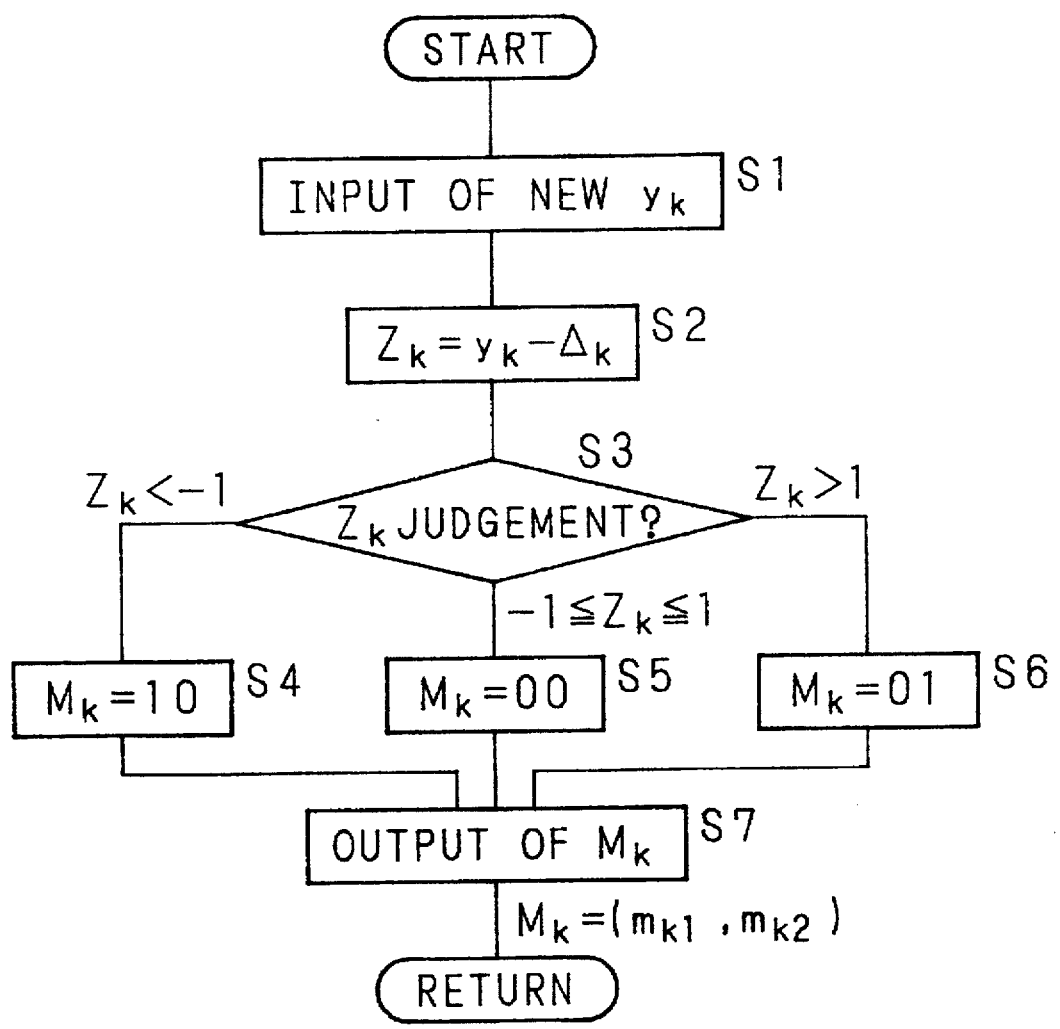
FIG. 3 is a flowchart showing the sequence of operating a merge determining unit of the maximum likelihood decoder.

In FIG. 3, the merge determining unit 21 judges the merge of the sampling data $y_k$ by using a sampling data $y_k$ from the A/D converter 6 and a reference value $\Delta_k$ from the reference value calculating unit 23, and outputs the determination value $M_k$. A new sampling data (input data) $y_k$ from the A/D converter 6 is inputted (Step S1). $Z_k$ is calculated as $Z_k=y_k-\Delta_k$ by using the input data $y_k$ and the reference value $\Delta_k$ (Step S2). +merge, −merge or no merge are respectively judged depending upon the value of $Z_k$ (Step S3). When it is −merge ($Z_k<-1$), the determination value $M_k=(m_{k1}, m_{k2})$ is set to 10 (Step S4). When it is no merge ($-1 \leq Z_k \leq 1$), the determination value $M_k$ is set to 00 (Step S5). When it is +merge ($Z_k>1$), the determination value $M_k$ is set to 01 (Step S6). And, the set determination value $M_k$ is outputted to the reference value calculating unit 23 and the merge detecting unit 24 (Step S7).

Figure 4:
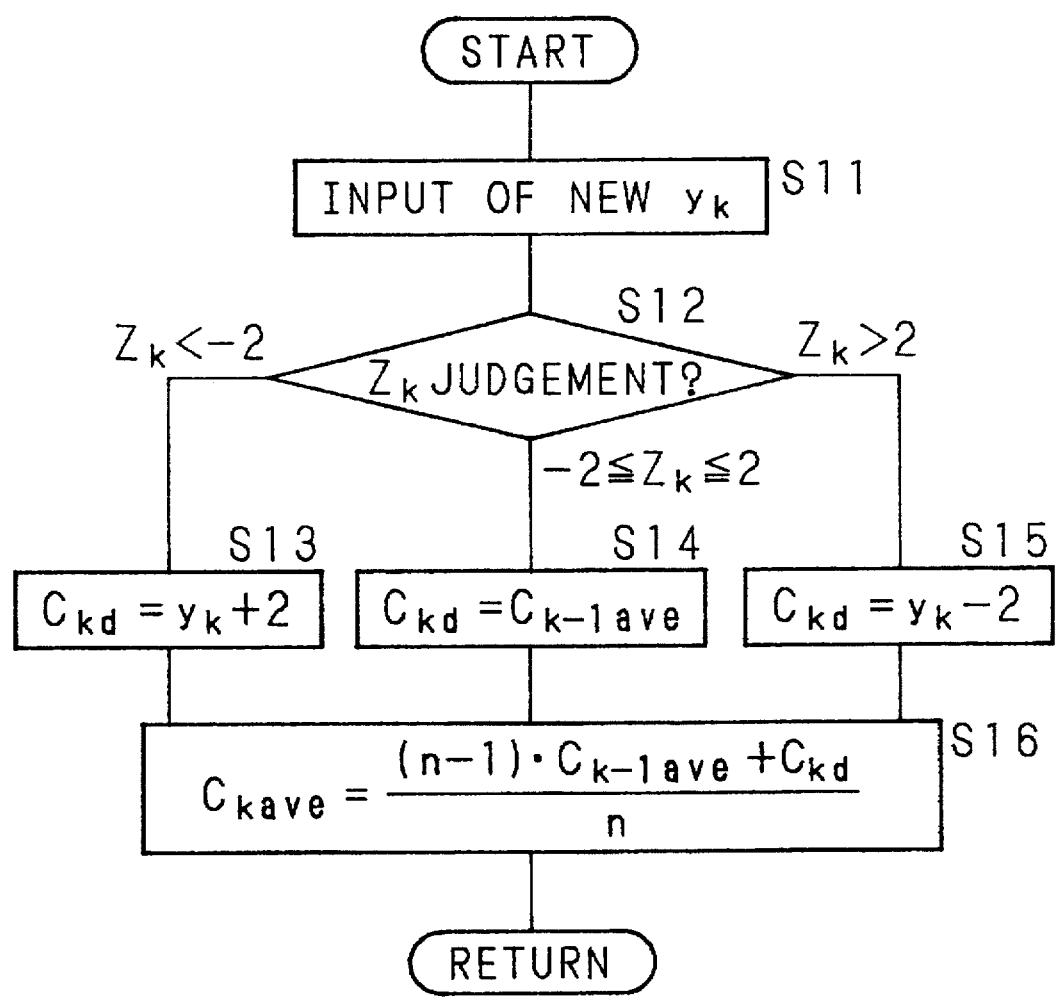
FIG. 4 is a flowchart showing the sequence of operating a central value calculating unit of the maximum likelihood decoder.

In FIG. 4 the central value calculating unit 22 calculates a central value $C_{kave}$, which is the central level of the reproduction value. When a new sampling data (input data) $y_k$) is inputted (Step S11), the value of $Z_k$ is judged (Step S12), and the central value data $C_{kd}$ is calculated depending upon the value of $Z_k$. In the case of $Z_k<-2$, the central value data $C_{kd}$ is calculated in accordance with $C_{kd}=y_k+2$ (Step S13), in the case of $-2 \leq Z_k \leq 2$, the central value data $C_{kd}$ is calculated in accordance with $C_{kd}=C_{k-lave}$ (Step S14), and in the case of $Z_k>2$, the central value data $C_{kd}$ is calculated in accordance with $C_{kd}=y_{k-2}$ (Step S15). The calculated central value data $C_{kd}$ and the previous calculated central value $C_{k-lave}$ are used to calculate the current central value $C_{kave}$ in accordance with $C_{kave}=[(n-1)C_{k-lave}+C_{kd}]/n$ (Step S16).

Figure 5:
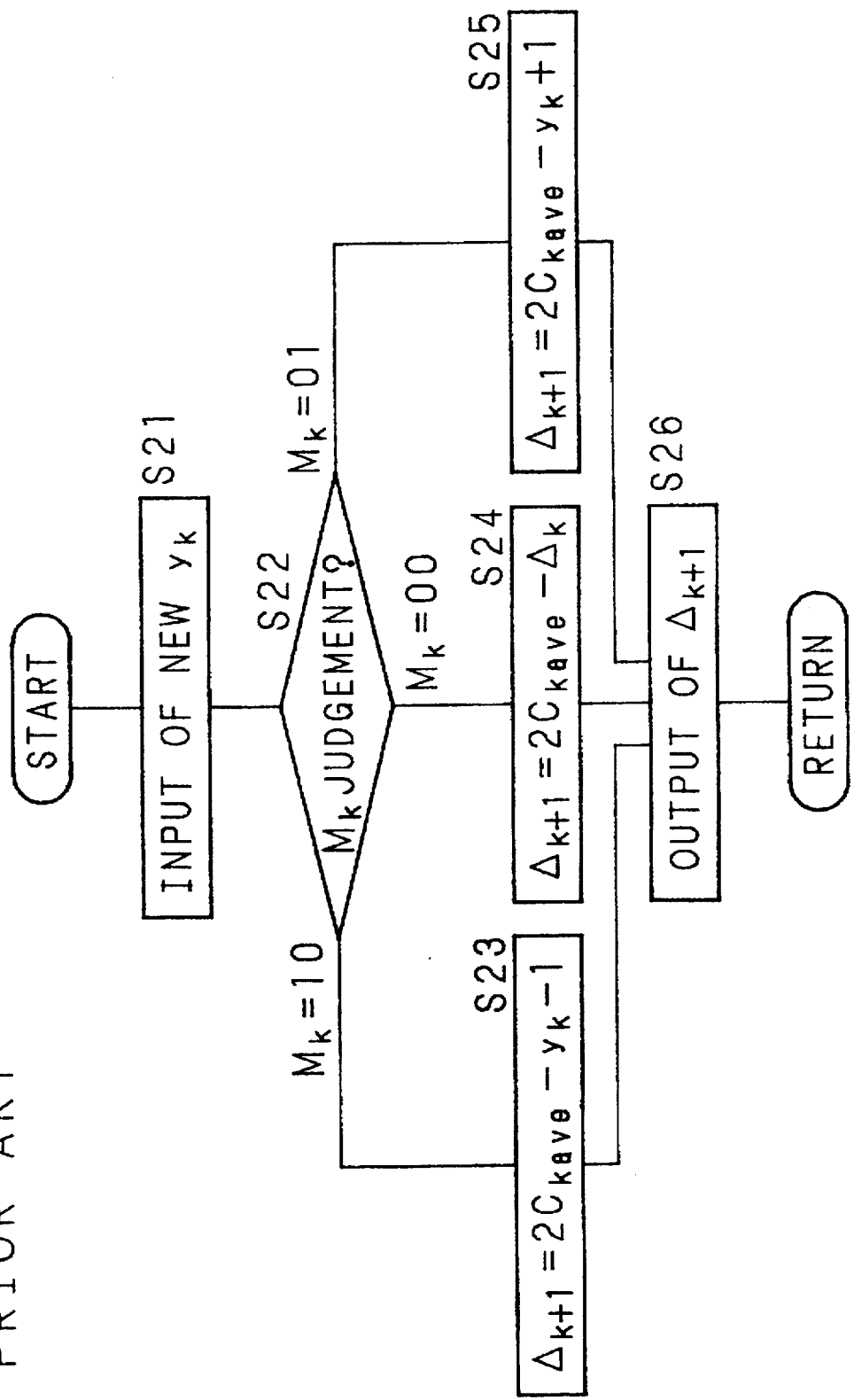
FIG. 5 is a flowchart showing the sequence of operating a reference value calculating unit of the maximum likelihood decoder.

In FIG. 5 the reference value calculating unit 23 calculates a reference value $\Delta_{k+1}$ by using the sampling data $y_k$ from the A/D converter 6, a determination value $M_k$ from the merge determining unit 21, and a central value $C_{kave}$ from the central value calculating unit 22. When a new sampling data (input data) $y_k$ is inputted from the A/D converter 6 (Step S21), the determination value $M_k$ is judged (Step S22), and the reference value $\Delta_{k+1}$ is calculated in accordance with the determination value $M_k$. In the case of $M_k=10(Z_k<-1$: −merge), the reference value $\Delta_{k+1}=2C_{kave}-y_k-1$ is calculated (Step S23). In the case of $M_k=00(-1 \leq Z_k \leq 1$: no merge), the reference value $\Delta_{k+1}=2C_{kave}-\Delta_k$ is calculated (Step S24). In the case of $M_k01$ ($Z_k>1$: +merge), the reference value $\Delta_{k+1}=2C_{kave}-y_k+1$ is calculated (Step S25). The calculated reference value $\Delta_{k+1}$ is outputted to the merge determining unit 21 (Step S26).

Figure 6:
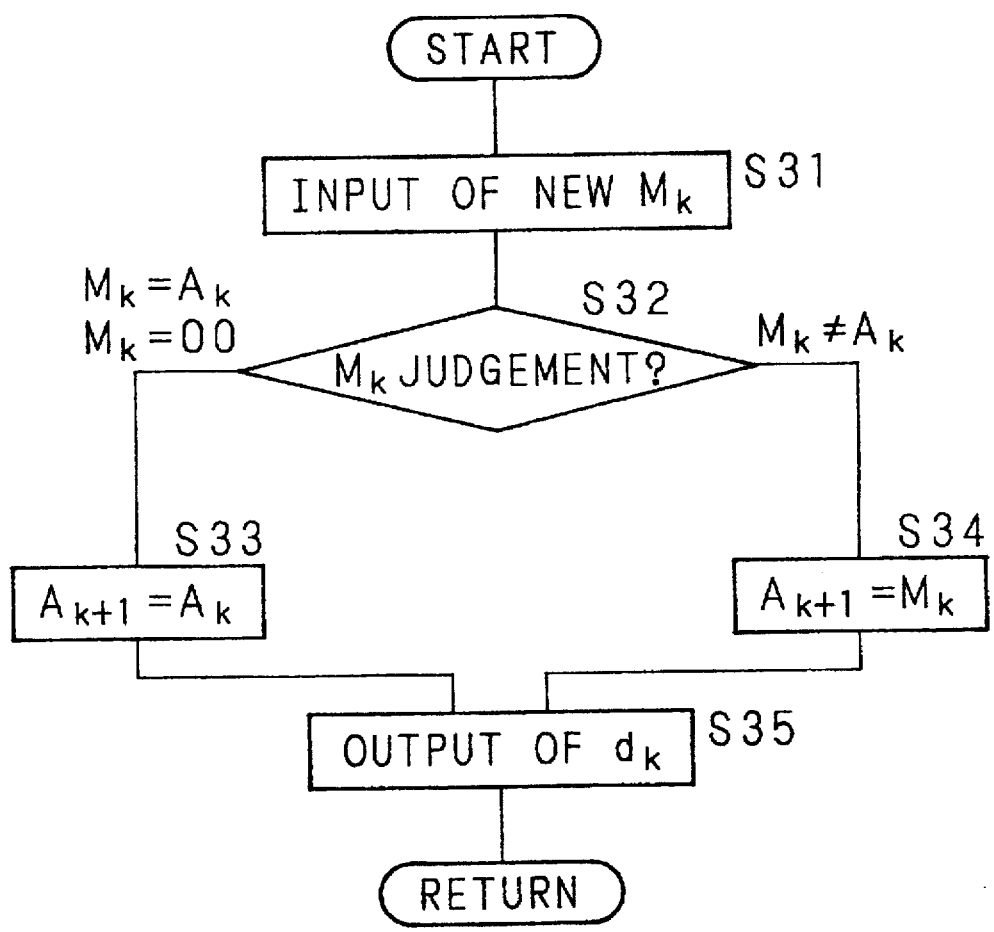
FIG. 6 is a flowchart showing the sequence of operating a merge detecting unit of the maximum likelihood decoder.
Figure 7:
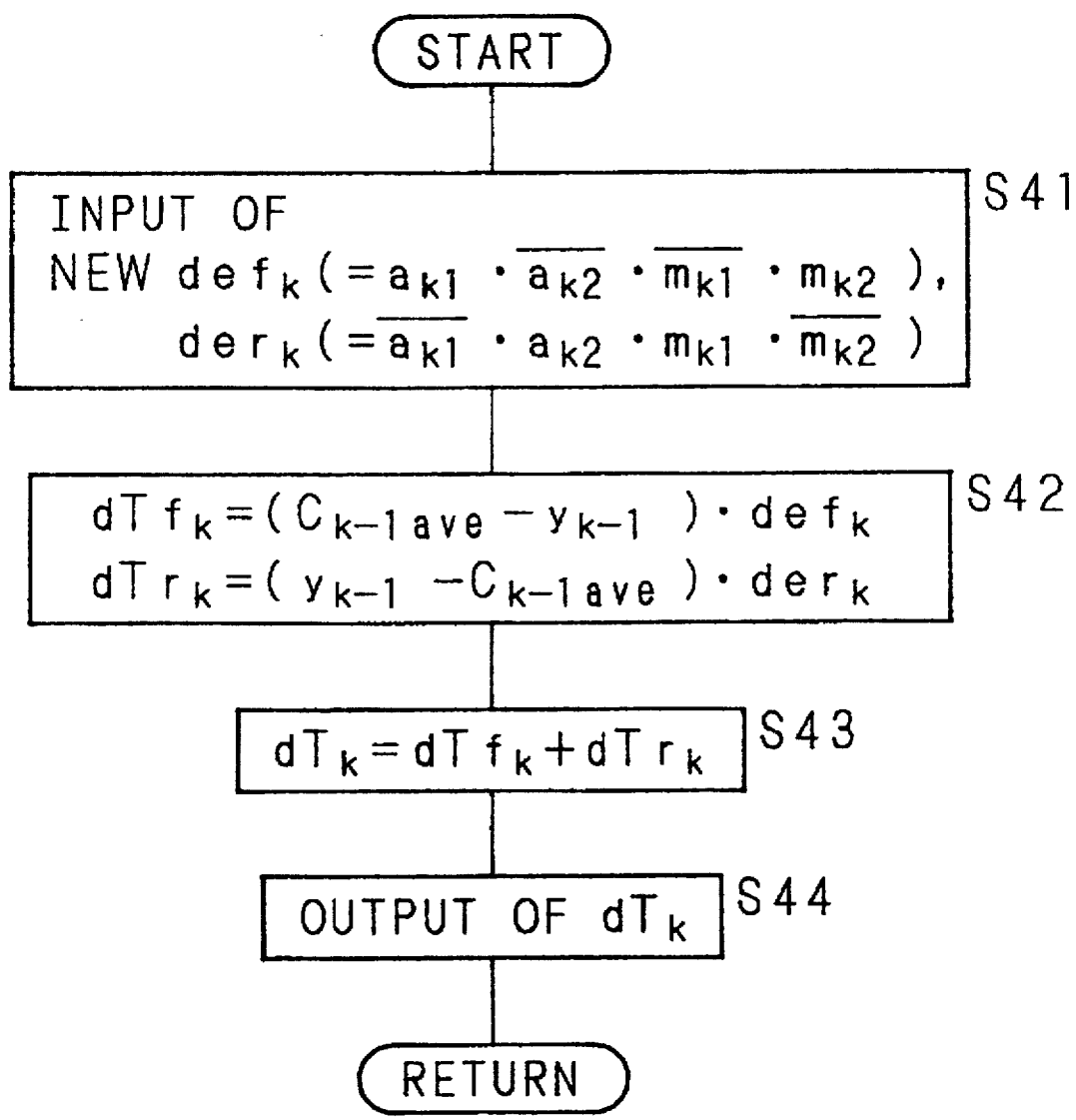
FIG. 7 is a flowchart showing the prior art sequence of operating a phase error detecting unit of the maximum likelihood decoder.
Figure 8A:
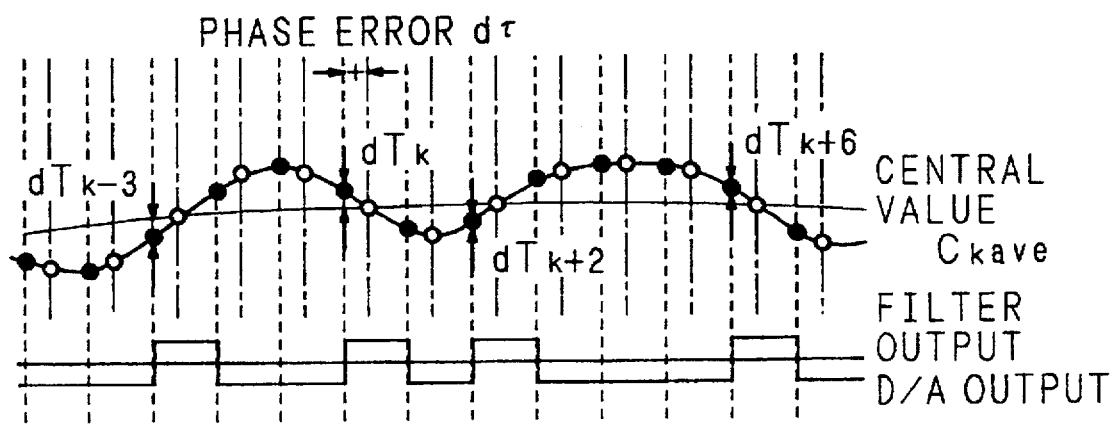
FIGS. 8A and 8B are views showing examples of generating a phase error control voltage.
Figure 8B:
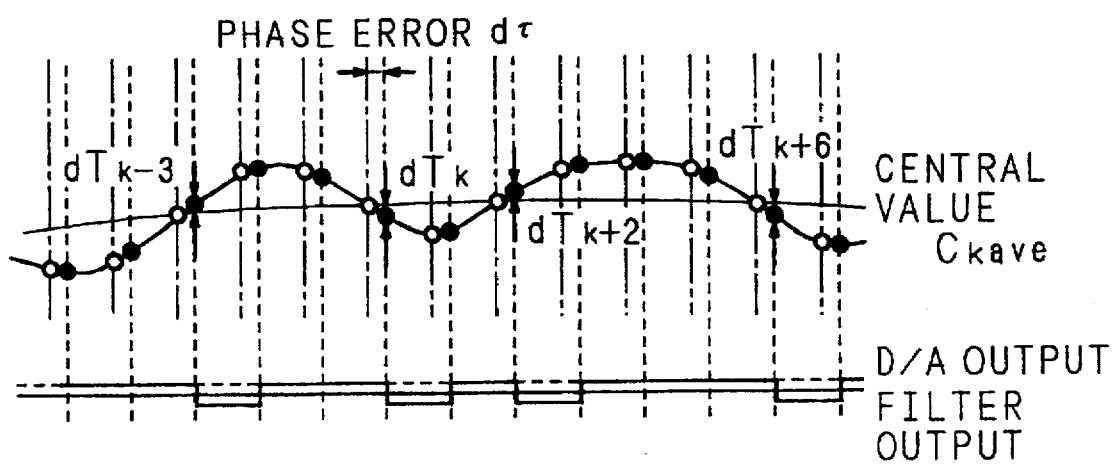

In FIG. 6, the merge detecting unit 24 detects a change in the sampling data $y_k$ from −merge to +merge and from +merge to −merge on the basis of the determination value $M_k$ from the merge determining unit 21. When a new determination value $M_k$ is inputted from the merge determining unit 21 (Step S31), a variable $A_k=(a_{k1}, a_{k2}) \neq (0,0)$, $(1,1)$ is defined, and the value of $M_k$ is judged (Step S32). In the case of $M_k=A_k$ (in the +merge or −merge with no change) or $M_k=00$ (no merge), $A_{k+1}=A_k$ is maintained without changing the previous variable $A_k$ (Step S33). In the case of $M_k \neq A_k$ (a change from +merge to −merge or a change from −merge to +merge), the variable $A_{k+1}$ is set to the previous determination value $M_k$, and $A_{k+1}=M_k$ is maintained (Step S34). In this way a maximum likelihood decode data $d_k$ is calculated in accordance with the following equation, and is outputted to the demodulator 8 (Step S35), $$d_k = def_k + der_k$$
$$= (a_{k1} \cdot \overline{a_{k2}} \cdot \overline{m_{k1}} \cdot m_{k2}) + (\overline{a_{k1}} \cdot a_{k2} \cdot m_{k1} \cdot \overline{m_{k2}})$$

Figure 12:
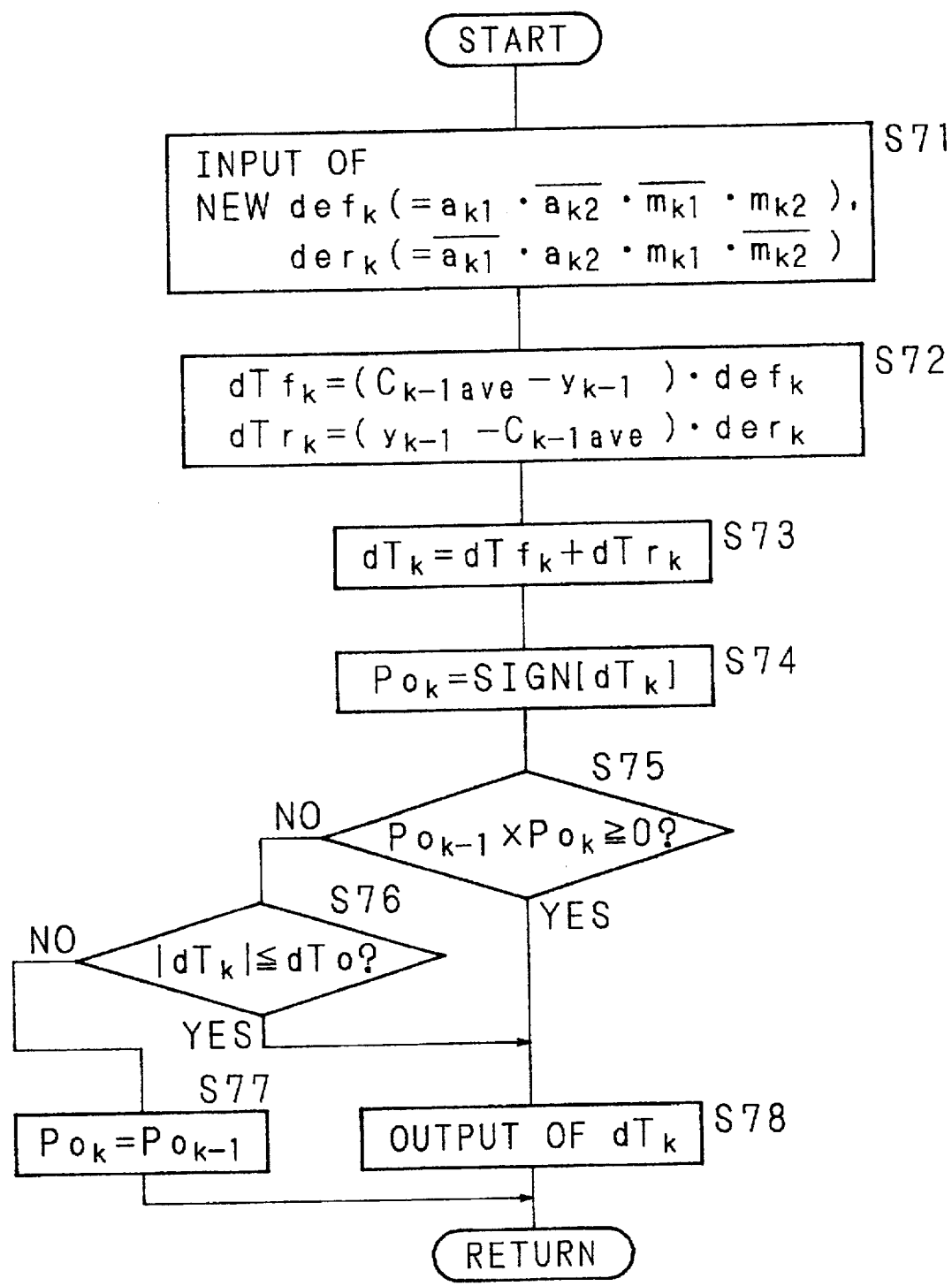
FIG. 12 is a flowchart showing the sequence of operating a phase error detecting unit of a maximum likelihood decoder according to the present invention.

The phase error detecting unit 25 is operated in accordance with the flowchart shown in FIG. 12, and calculates a phase error data $dT_k$ on the basis of a sampling data $y_k$ from the A/D converter 6, a central value $C_{kave}$ from the central value calculating unit 22, and a maximum likelihood decode data $d_k$ from the merge detecting unit 24. When a new maximum likelihood decode data $d_k$ [leading-edge maximum likelihood decode data $der_k$ ("1" or "0") and trailing-edge maximum likelihood decode data $d_{efk}$ ("1" or "0")] is inputted from the merge detecting unit 24 by a clock timing k (Step S71), the leading-edge phase error data $dTf_k$ is calculated in accordance with $dTf_k=(C_{k-lave}-y_{k-1}).def_k$ by using the central value $C_{k-lave}$ and the sampling data $y_{k-1}$ obtained by the previous clock timing k−1 and the leading-edge maximum likelihood decode data $def_k$, and the trailing-edge phase error data $dTr_k$ is calculated in accordance with $dTr_k=(y_{k-1}-C_{k-lave}).der_k$ by using the central value $C_{k-lave}$ and the sampling data $y_{k-1}$ obtained by the previous clock timing k−1 and the trailing-edge maximum likelihood decode data $der_k$ (Step S72). Since the leading-edge maximum likelihood decode data $def_k$ becomes "1" at the leading-edge point (ascending point) of the reproduction signal, the leading-edge phase error data $dTf_k$ corresponds to the difference between the central value of the reproduction signal and the sampling data at the leading-edge point. Likewise, the trailing-edge phase error data $dTr_k$ corresponds to the difference between the central value of the reproduction signal and the sampling data at the trailing-edge point (descending point). The phase error data $dT_k$ is calculated from the sum of the leading-edge phase error data $dTf_k$ and the trailing-edge phase error data $dTr_k$ (Step S73).

The polarity $Po_k$ of the obtained phase error data $dT_k$ is determined by using a SIGN function (Step S74). A polarity change in the phase error data is obtained by multiplying the polarity $Po_k$ by the one-clock previous polarity $Po_{k-1}$, and it is judged whether the product is not less than "0" (Step S75). FIG. 13 is a table showing the pattern of truth values of the polarity change. When the product is not less than "0", the obtained phase error data $dT_k$ is outputted to the D/A converter 11 (Step S78). When the product is less than "0", the absolute value of the obtained phase error data $dT_k$ and a predetermined threshold level $dT_0$ are compared (Step S76). When the absolute value of the phase error data $dT_k$ is equal to or below the threshold level $dT_0$, the obtained phase error data $dT_k$ is outputted to the D/A converter 11 (Step S78). When it is larger than the threshold level $dT_0$, the current polarity $Po_k$ is set to the previous polarity $Po_{k-1}$ ($Po_k$=$Po_{k-1}$) (Step S77), and the sequence is returned without outputting the phase error data $dT_k$.

Figure 14:
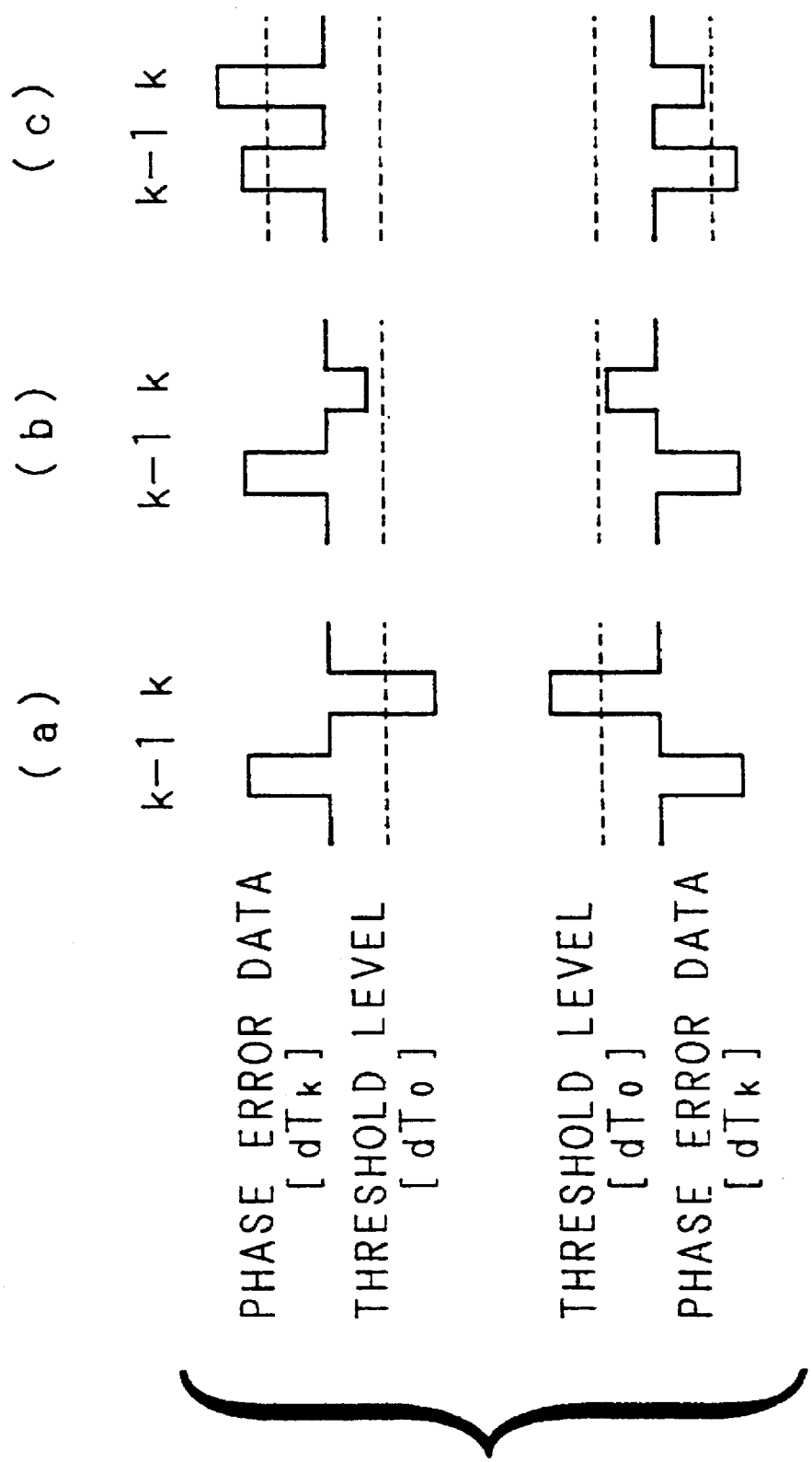
FIG. 14 is a view showing an example of neighboring phase error data in a time sequence.

In FIG. 12 the combination of the current phase error data and the previous phase error data is classified into three kinds of patterns depending upon the code of the code ($Po_k \times Po_{k-1}$) and the magnitude of the phase error data $dT_k$. FIG. 14 shows the three kinds of patterns. FIG. 14(a) shows a pattern where the judgement is NO ($Po_k \times Po_{k-1}<0$) at Step S75, and again is NO ($|dTk|>dT_0$) at Step S76. In this pattern the polarity changes when the clock timing changes from k-1 to k, and the phase error data $dT_k$ exceeds the threshold level. This corresponds to a case where a shift in the detected maximum decode likelihood decode data occurs owing to an error. In this case the polarity $Po_k$ by the clock timing k is substituted by the polarity $Po_{k-1}$ by the clock timing k-1, and the sequence advances to the next clock processing step without outputting the phase error data. As a result, if an error occurs in the detection data, the error is prevented from propagating to the next detection data.

FIG. 14(b) shows a pattern where the judgement is NO ($Po_k \times Po_{k-1}<0$) at Step S75, and is YES ($|dTk| \leq dT_0$) at Step S76. In this pattern the polarity does not change but the phase error data $dT_k$ does not exceed the threshold level, and the phase error data $dT_k$ is outputted and the sequence advances to the next clock. FIG. 14(c) shows a pattern where the judgement is YES ($Po_k \times Po_{k-1} \geq 0$) at Step S75. In this pattern, since the polarities are the same, the phase error date $dT_k$ is outputted, and the sequence advances to the next clock.

As is evident from the foregoing description, the Embodiment 1 also described above detects a phase error $dT_k$ from the sampling value $y_k$, the maximum likelihood decode data $d_k$, and the central value $C_{kave}$ of the reproduction signal, and compensates a phase shift of a synchronous clock in the PLL-base system by using the detected phase error data $dT_k$, but Embodiment 1 is different from the prior art in that it controls whether the detected phase error data $dT_k$ is delivered to the PLL-base system or not, on the basis of a change in the polarity of the phase error data $dT_k$ and the amplitude thereof.

Figure 15:
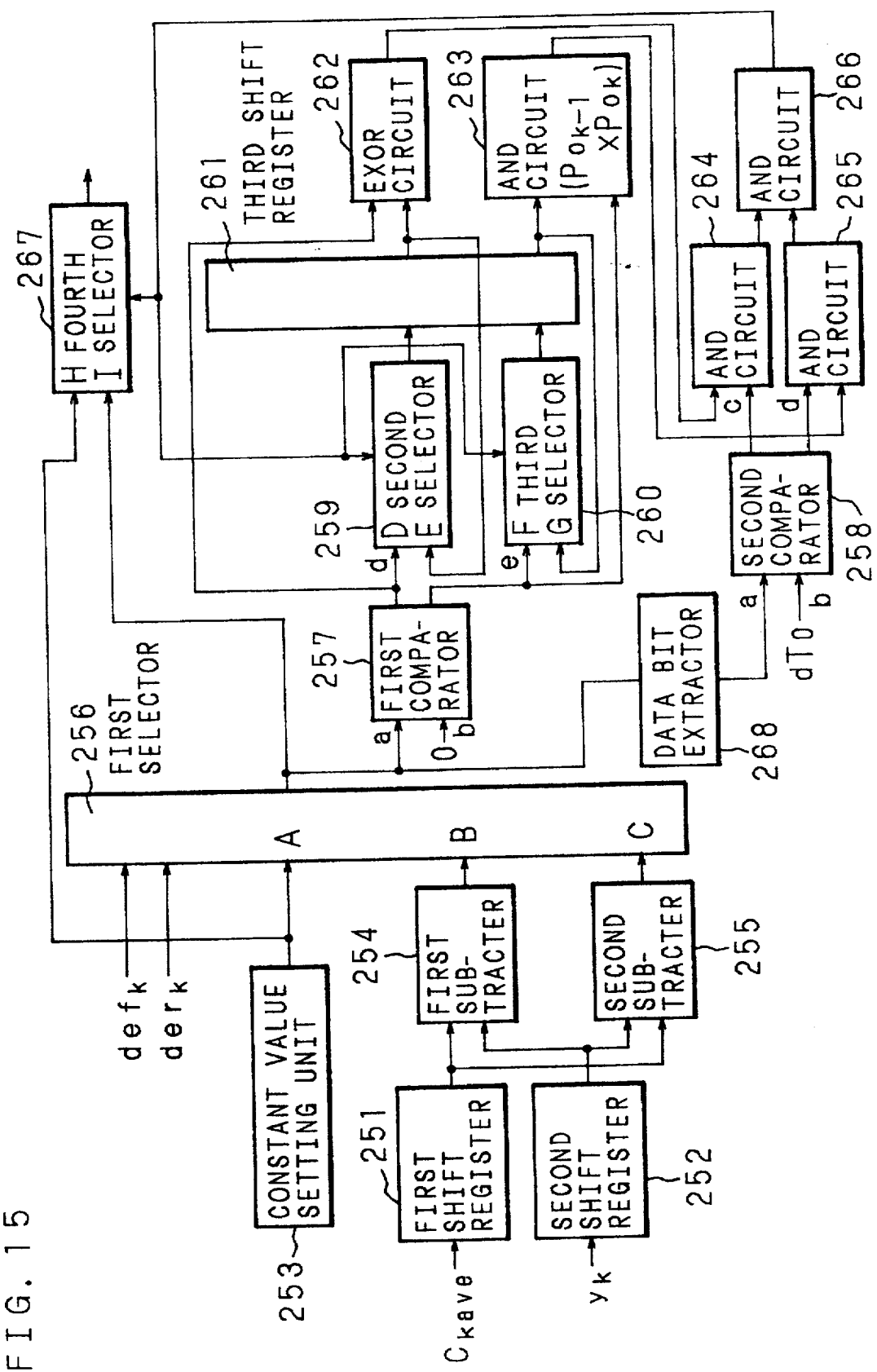
FIG. 15 is a block diagram illustrating the internal structure of a phase error detecting unit of a maximum likelihood decoder.

Referring to FIG. 15, which illustrates a structure of the phase error detecting unit 25 according to the present invention, the phase error detecting unit 25 will be described:

The phase error detecting unit 25 includes a first shift register 251, a second shift register 252, a constant value setting unit 253, a first subtracter 254, a second subtracter 255, a first selector 256, a first comparator 257, a second comparator 258, a second selector 259, a third selector 260, a third shift register 261, an EXOR circuit 262, four AND circuits 263, 264, 265, and 266, a fourth selector 267, and a data bit extractor 268.

Figure 16:
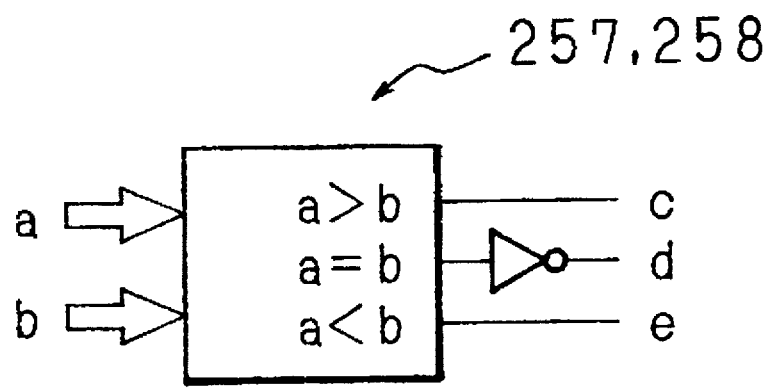
FIG. 16 is a view showing an input/output relationship in a comparator of the phase error detecting unit.

Referring to FIG. 16, the input/out characteristics in the first comparator 257 and the second comparator 258 will be described:

When two input values a and b are respectively inputted to the first and second comparators 257 and 258, these values a and b are compared, and 1-bit data c, d or e is outputted depending upon a dimensional relationship therebetween.

The first shift register 251 holds a central values $C_{kave}$ from the central value calculating unit 22 until the next clock timing. The second shift register 252 holds a sampling value $y_k$ obtained by the A/D converter 6 until the next clock timing. The first subtracter 254 subtracts a sampling value $y_{k-1}$ from the second shift register 252 from the central value $C_{k-lave}$ from the first shift register 251. The value outputted from the first subtracter 254 by a clock timing corresponding to the leading-edge becomes a calculated leading-edge phase error data $dTf_k$ at Step S72 as shown in FIG. 12. The second subtracter 255 subtracts the central value $C_{k-lave}$ from the first shift register 251 from the sampling value $y_{k-1}$ from the second shift register 252. The value outputted from the second subtracter 255 by a clock timing corresponding to the trailing-edge becomes a calculated trailing-edge phase error data $dTr_k$ at Step S72 as shown in FIG. 12. The constant value setting unit 253 has a previously set constant value "0".

The first selector 256 includes three input terminals A, B and C. The constant value "0" set at the constant value setting unit 253 is inputted to the input terminal A, a value from the first subtracter 254 is inputted to the input terminal B, and a value from the second subtracter 255 is inputted to the input terminal C. The first selector 256 selects an input terminal corresponding to a leading-edge maximum likelihood decode data $def_k$ and a trailing-edge maximum likelihood decode data $der_k$ in accordance with the table shown in FIG. 17A. More specifically, the first selector 256 outputs the leading-edge phase error data $dTf_k$ by a clock timing ($def_k$="1", $der_k$="0") corresponding to a leading-edge point of the reproduction signal, the trailing-edge phase error data $dTr_k$ by a clock timing ($def_k$="0", $der_k$="1"), and the constant value "0" by a clock timing ($def_k$="0", $der_k$="0") corresponding to other points except the leading-edge point and the trailing-edge point of the reproduction signal.

The output value of the first selector 256 is inputted to the fourth selector 267, the first comparator 287 and the data bit extractor 268. The fourth selector 267 includes two input terminals H and I, and a constant value "0" set at the constant value setting unit 253 is inputted to the input terminal H, and an output value from the first selector 256 is inputted to the input terminal I. In addition, an output value from the AND circuit 266 referred to below is inputted to the fourth selector 267. In accordance with the table shown in FIG. 17D, an input value to be inputted to the input terminal H is selected when the output value of the AND circuit 266 is "1", and the input value to be inputted to the input terminal I is selected when the output value is "0", and the selected value is outputted to the D/A converter 11.

The first comparator 257 receives an output value from the first selector 256 as an input value a, and the constant value "0" as an input value b. The two values are compared, and depending upon the result of comparison, 1-bit output value d is outputted to the second selector 259 and the EXOR circuit 262 or 1-bit output value e is outputted to the third selector 260 and the AND circuit 263. FIG. 18 is a table corresponding to FIG. 13 which shows a pattern of truth values of the polarity change occurring in the phase error data, with respect of output values e and d from the first comparator 257.

The second selector 259 has two input terminals D and E, and a 1-bit output value d from the first comparator 257 is inputted to the input terminal D, and an output value d from the third shift register 261 at the rear stage is inputted to the input terminal E. The output value of the AND circuit 266 is inputted to the second selector 259, and in accordance with the table shown in FIG. 17B, when the output value of the AND circuit 266 is "0", the input value to the input terminal D is selected, and when the output value thereof is "1", the input value to the input terminal E is selected, and the selected value is outputted to the third shift register 261. Likewise, the third selector 260 includes two input terminals F and G, and a 1-bit output value e from the first comparator 257 is inputted to the input terminal F and an output value e from the third shift register 261 at the rear stage is inputted to the input terminal G. An output value of the AND circuit 266 is inputted to the third selector 260. In accordance with the table shown in FIG. 17C, when the output value of the AND circuit 266 is "0", the input value to the input terminal F is selected, and when it is "1", the input value to the input terminal G is selected, and the selected value is outputted to the third shift register 261.

The EXOR circuit 262 determines an EXOR of the output value d from the first comparator 257 and the output value d from the third shift register 261, and outputs it to the AND circuit 264. The AND circuit 263 determines an AND of the output value e from the first comparator 257 and the output value e from the third shift register 261, and outputs it to the AND circuit 265.

If, for example, the first selector 256 outputs an 8-bit output value, wherein the most significant bit (MSB) represents a code (positive, negative), and the other seven bits represent the amplitude of the level. The data bit extractor 268 extracts the 7-bit data bits except the MSB from an output value of 8-bit from the first selector 256, and outputs it to the second comparator 258 to which an input value from the data bit extractor 268 is inputted as an input value a, and the threshold level $dT_0$ is inputted as an input value b. The two values are compared, and depending upon the result of comparison, a 1-bit output value c is outputted to the AND circuit 264, and a 1-bit output value d is outputted to the AND circuit 265.

The AND circuit 264 determines the AND of the output value from the EXOR circuit 262 and the output value c from the second comparator 258, and outputs it to the AND circuit 266. The AND circuit 265 determines the AND of the output value from the AND circuit 263 and the output value d from the second comparator 258, and outputs it to the AND circuit 266. The AND circuit 266 determines the AND of the output from the AND circuit 264 and the output from the AND circuit 265, and outputs it to the second selector 259, the third selector 260 and the fourth selector 267.

The operation of Embodiment 1 will be described:

A reproduction signal having a partial response characteristic corresponding to a maximum likelihood decoding obtained by the optical head 2 from the optical disk 1 is delivered to the A/D converter 6 through the amplifier 3, the equalizer 4 and the LPF 5. The A/D converter 6 obtains a sampling value of the reproduction signal in synchronism with a clock signal from the VCO 13, and delivers it to the maximum likelihood decoder 7. The maximum likelihood decoder 7 processes the sampling value in the merge determining unit 21, the central value calculating unit 22, the reference value calculating unit 23 and the merge detecting unit 24 in accordance with the flowcharts shown in FIG. 3, FIG. 4, FIG. 5 and FIG. 6, and the maximum likelihood decode data $d_k$ is obtained. The obtained maximum likelihood decode data $d_k$ is outputted to the demodulator 8. The maximum likelihood decoder 7 is operated in synchronism with a clock signal from the VCO 13.

The maximum likelihood decoder 7 processes at the phase error detecting unit 25 as shown in FIG. 12 and a phase error data $dT_k$ is obtained. The phase error data $dT_k$ is outputted to the D/A converter 11 where the data $dT_k$ is converted into a phase error signal. This phase error signal is converted into a voltage level by the LPF 12. The phase of the reference clock signal is adjusted by the VCO 13 in accordance with the converted voltage level, and the adjusted clock signal is delivered to the A/D converter 6 and the maximum likelihood decoder 7.

Synchronizing with the clock signal, the A/D converter 6 performs the sampling and the maximum likelihood decoder 7 performs the detection of the maximum likelihood decode data $d_k$ and the phase error data $dT_k$. The maximum likelihood decode data $d_k$ delivered to the demodulator 8 is relieved of the ½ run-length limitation. In this way the original record data is reproduced.

Embodiment 2

Figure 9:
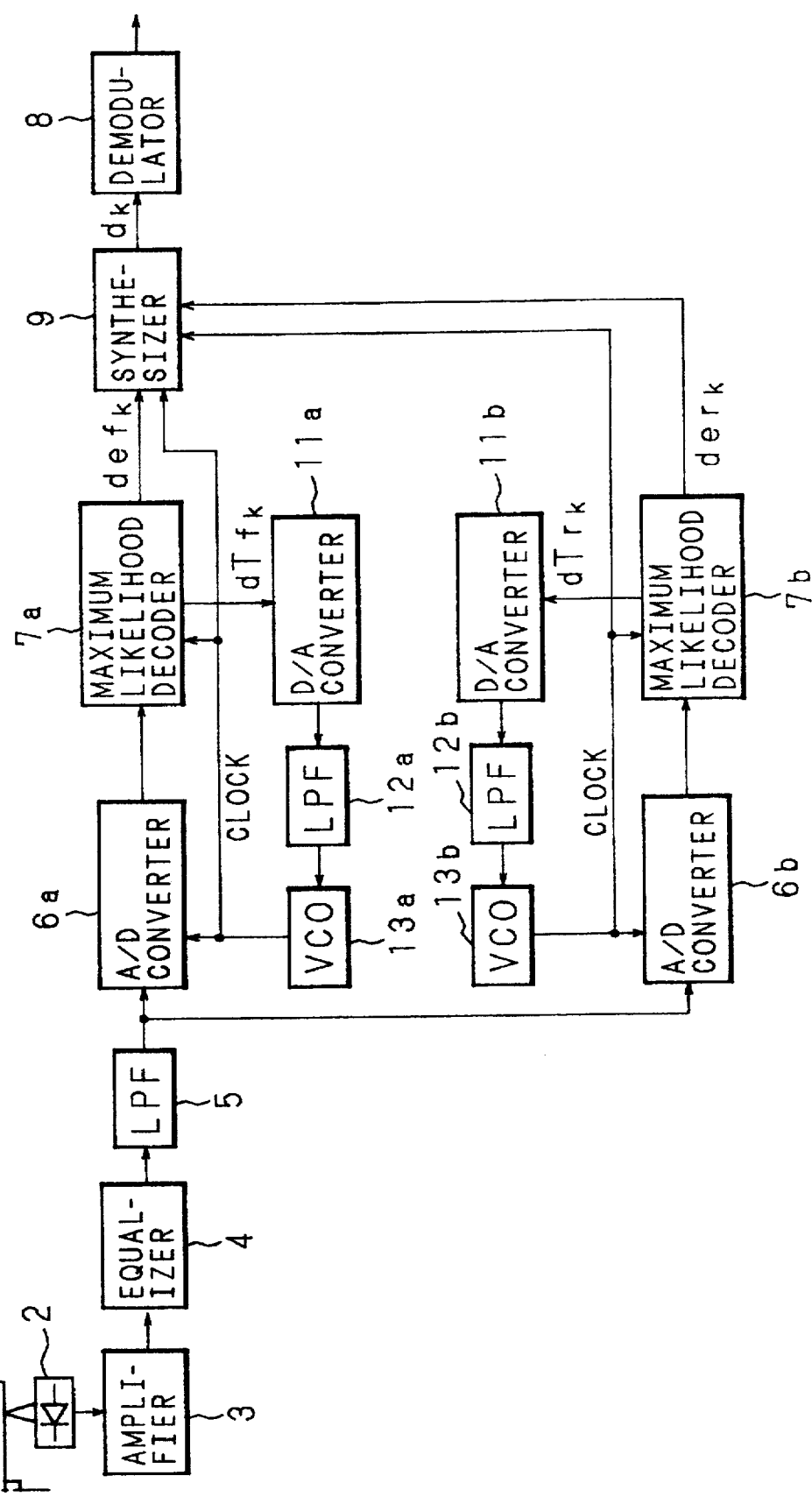
FIG. 9 is a block diagram illustrating a reproduction system (a leading-edge and trailing-edge independence type) in an optical disk according to a maximum likelihood decoding method.
Figure 11A:
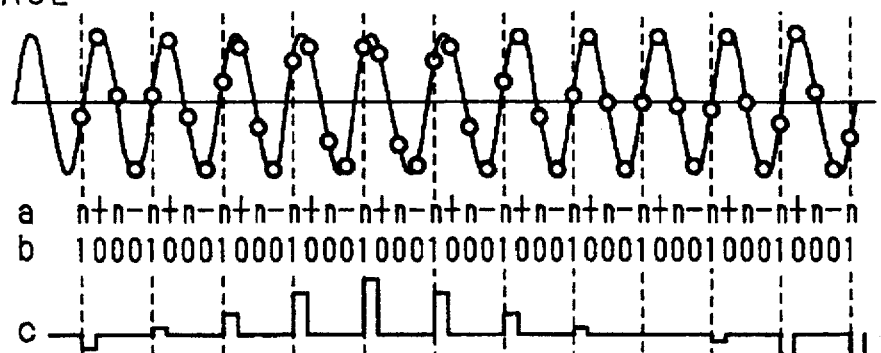
FIGS. 11A, 11B and 11C are views exemplifying the problems arising in the prior art phase error control.
Figure 11B:
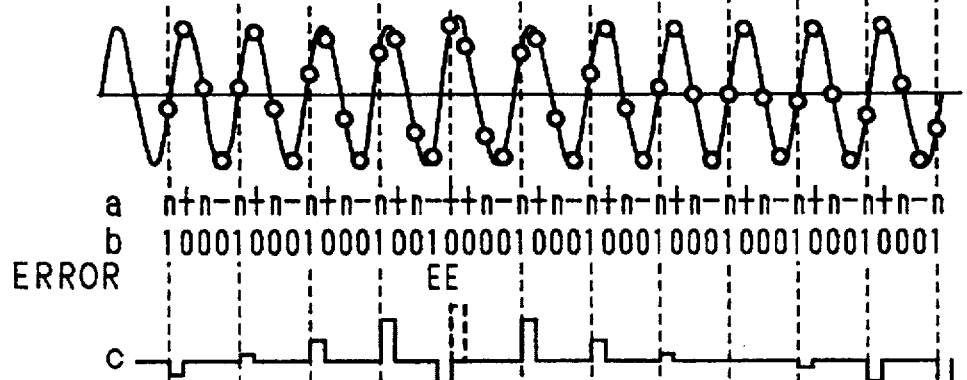
Figure 11C:
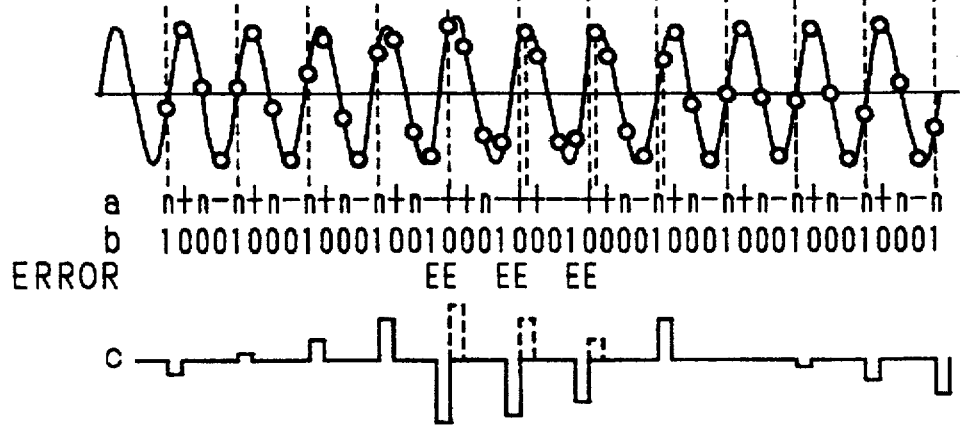

This Embodiment 2 (the front and trailing-edge independent system) has basically the same structure as that shown in FIG. 9, which is proposed in Japanese Patent Application No. 6-225433, but Embodiment 2 is different from the prior art, in the maximum likelihood decoder 7a and 7b, especially the phase error detecting unit FIG. 9 illustrates the overall structure of a data reproduction apparatus according to Embodiment 2, wherein like reference numerals designate like elements and components to those in FIG. 1. Referring to FIG. 9, the reproduction of a signal under the front and trailing-edge independent system according to Embodiment 2 will be described:

The A/D converter 6a, the maximum likelihood decoder 7a, the D/A converter 11a, the LPF 12a and the VCO 13a constitute a maximum likelihood decode data detecting system for a leading-edge, and the A/D converter 6b, the maximum likelihood decoder 7b, the D/A converter 11b, the LPF 12b and the VCO 13b constitute a maximum likelihood decode data detecting system for a trailing-edge. The A/D converter 6a, 6b, D/A converter 11a, 11b, LPF 12a, 12b, and VCO 13a, 13b have the same structure as those of the A/D converter 6, D/A converter 11, LPF 12 and VCO 13 shown in FIG. 1.

Each of the maximum likelihood decoders 7a and 7b has the same structure as that of the maximum likelihood decoder 7 (refer to FIG. 2) shown in FIG. 1. In FIG. 9, however, the leading-edge system and the trailing-edge system are independently provided. In the leading-edge maximum likelihood decoder 7a, the merge detecting unit 24 outputs a leading-edge maximum likelihood decode data $def_k$, and the phase error detecting unit 25 outputs a leading-edge phase error data $dTf_k$. In the trailing-edge maximum likelihood decoder 7b, the merge detecting unit 24 outputs a trailing-edge maximum likelihood decode data $der_k$, and the phase error detecting unit 25 outputs a trailing-edge phase error data $dTr_k$.

Figure 19:
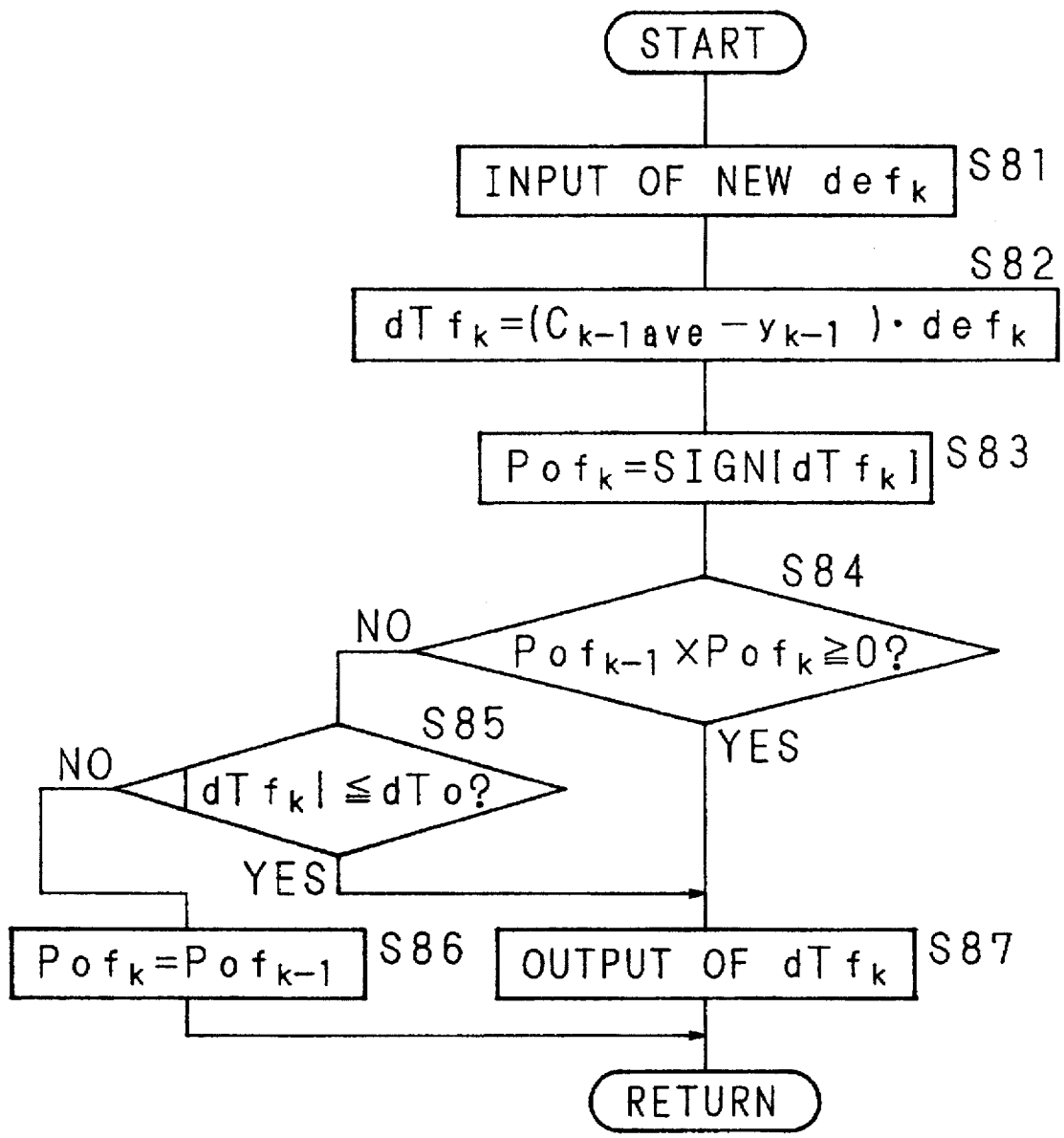
FIG. 19 is a flowchart showing the sequence of operating a phase error detecting unit according to the present invention.
Figure 20:
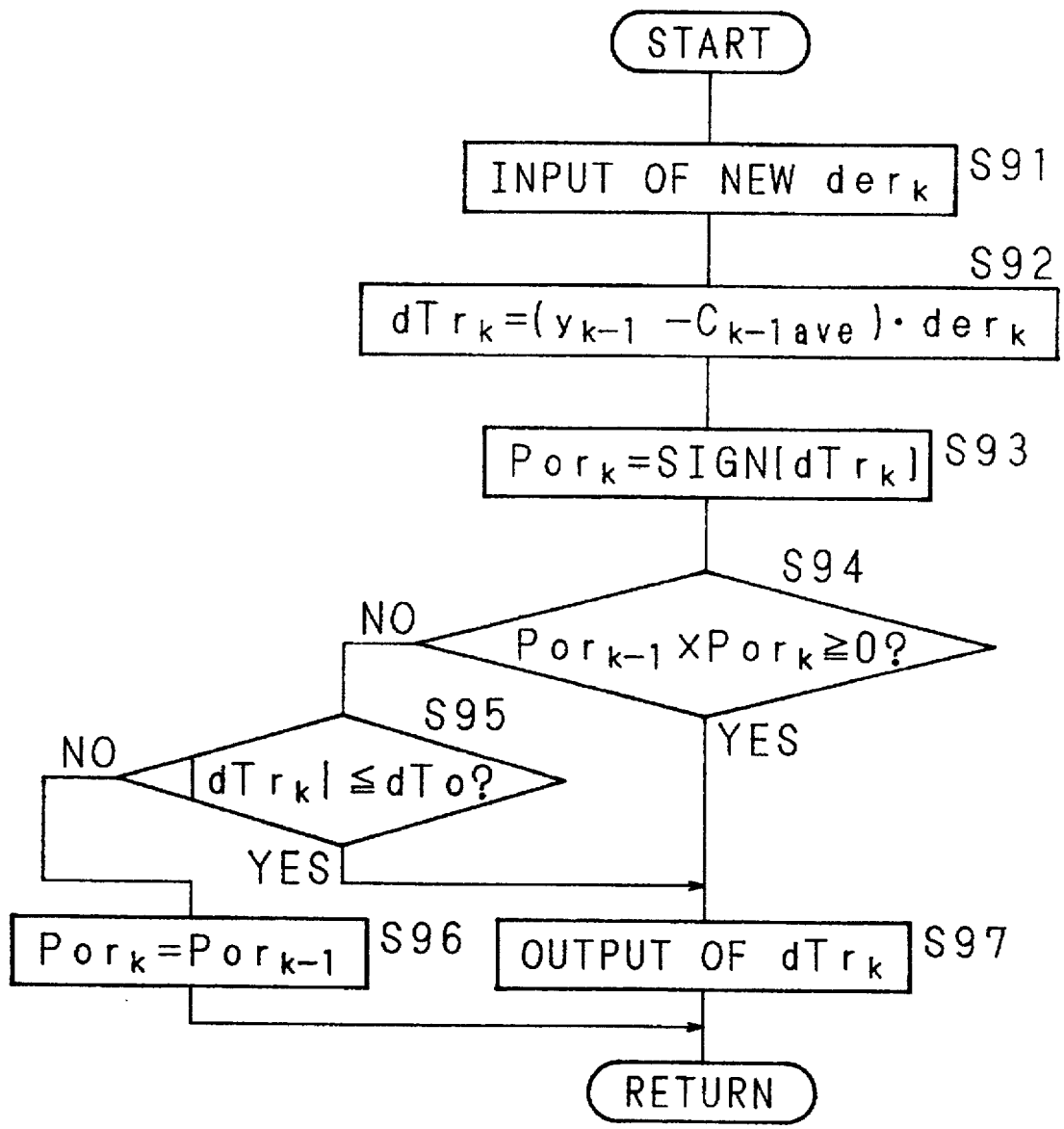
FIG. 20 is a flowchart showing the sequence of operating a phase error detecting unit according to another aspect of the present invention.

FIGS. 19 and 20 respectively show the sequences of operating the leading-edge and trailing-edge phase error detecting units 25. In the leading-edge phase error detection shown in FIG. 19, when a new leading-edge maximum likelihood decode data $def_k$ is inputted (Step S81), the leading-edge phase error data $dTf_k$ is calculated by reference to $dTf_k = (C_{k\text{-}lave} - y_{k-1}).def_k$ (Step S82). Then, the polarity $Pof_k$ of the leading-edge phase error data $dTf_k$ is determined (Step S83) by using a SIGN function. The polarity $Pof_k$ is multiplied by the one-clock previous polarity $Pof_{k-1}$ so as to determine a polarity change, and judge whether the product is not less than 0 (zero) (Step S84). When it is not less than 0, the obtained leading-edge phase error data $dTf_k$ is outputted to the D/A converter 11a (Step S87). If the product is less than 0, the absolute value of the leading-edge phase error data $dTf_k$ and a predetermined threshold level $dT_0$ are compared (Step S85). If the absolute value of the leading-edge phase error data $dTf_k$ is not more than the threshold level $dT_0$, the leading-edge phase error data $dTf_k$ is outputted to the D/A converter 11a (Step S87). If it is larger than $dT_0$, the current polarity $Pof_k$ is substituted by the former polarity $Pof_{k-1}$ ($Pof_k = Pof_{k-1}$) (Step S86) and the sequence is returned without outputting the leading-edge phase error data $dTf_k$.

In the trailing-edge phase error detection shown in FIG. 20, when a new trailing-edge maximum likelihood decode data $der_k$ is inputted (Step S91), the trailing-edge phase error data $dTr_k$ is calculated with $dTr_k = (y_{k-1} - C_{k\text{-}lave}).der_k$ (Step S92). Then, the polarity $Pork$ of the trailing-edge phase error data $dTr_k$ is determined by using a SIGN function (Step S93). The polarity $Por_k$ is multiplied by the one-clock previous polarity $Por_{k-1}$ so as to determine a polarity change, and judge whether the product is not less than 0 (zero) (Step S94). When it is not less than 0, the obtained trailing-edge phase error data $dTr_k$ is outputted to the D/A converter 11b (Step S97). If the product is less than 0, the absolute value of the trailing-edge phase error data $dTr_k$ and a predetermined threshold level $dT_0$ are compared (Step S95). If the absolute value of the trailing-edge phase error data $dTr_k$ is not more than the threshold level $dT_0$, the trailing-edge phase error data $dTr_k$ is outputted to the D/A converter 11b (Step S97). If it is larger than $dT_0$, the current polarity $Por_k$ is substituted by the former polarity $Por_{k-1}$ ($Por_k = Por_{k-1}$) (Step S96) and the sequence is returned without outputting the trailing-edge phase error data $dTr_k$.

The leading-edge maximum likelihood decode data $def_k$ and the trailing-edge maximum likelihood decode data $der_k$ from the maximum likelihood decoders 7a and 7b are inputted to a synthesizer 9, which is constituted with an FIFO memory or the like, while the former synchronizes with a leading-edge clock signal from the VCO 13a, and the latter synchronizes with a trailing-edge clock signal from the VCO 13b. The leading-edge maximum likelihood decode data $def_k$ and the trailing-edge maximum likelihood decode data $der_k$ are alternately read out from the synthesizer 9 in synchronism with either the leading-edge clock signal or the trailing-edge clock signal. In this way a synthesized maximum likelihood decode data $d_k$ is obtained. The synthesized data $d_k$ is demodulated into the original record signal by the demodulator 8 similarly to the example shown in FIG. 1.

The Embodiments described above are constructed such that if an error occurs during the maximum likelihood decoding time, the phase error detecting unit 25 outputs no phase error data so as to prevent a possible propagation of the decoding error. Alternatively, it is possible to ensure that if an error occurs in a maximum likelihood decode, the former phase error data can be again outputted so as to prevent the propagation of the decoding error. In this case, a shift register is provided in the circuit shown in FIG. 15 so as to hold the output from the fourth selector 267 until the next clock timing, and the output value of the shift register is inputted to the input terminal H of the fourth shift register 267 instead of the constant value "0" of the constant value setting unit 253. Under this arrangement either the input terminal H or I of the fourth selector 267 is selected in accordance with the output value of the AND circuit 266 in the same manner as described above.

In the Embodiments described above, reference has been made to a case where a phase shift of a synchronous clock signal is compensated exclusively on the basis of the detected phase error data. In addition, the present invention can be applied to every case where phase error data is utilized. For example, the present invention can be applied to a reproduction system under which a phase shift of a clock signal is compensated by a signal obtained by adding a detected phase error signal to a synchronous signal obtained by slicing an analog reproduction signal in a binary circuit. The present invention is also applied to a reproduction system under which either of the synchronous signals obtained by slicing an analog reproduction signal in a binary circuit and the detected phase error signal is selected, and the selected signal is used to compensate the phase shift of a clock signal.

As is evident from the foregoing description, even if a phase error occurs at a sampling point ideal for a synchronous clock signal, it is canceled by the PLL circuit, thereby ensuring that a reproduction signal is constantly sampled at an optimum position. As a result, the maximum likelihood decoding is accurately performed. Even if an error occurs during maximum likelihood decoding time, the decoding error is prevented from affecting the clock signal and propagating.

In the prior art if an error occurs in the decode data due to noise, edge shift, or defective medium, the phase error signal is likely to amplify the phase shift and allow the error to propagate. In such cases, the present invention automatically corrects a phase shift of the clock signal, thereby reducing the possibility of error propagation, improving in the error rate, and enhancing the mass-productivity because of having no necessity of phase adjustment.

As this invention may be embodied in several forms without departing from the spirit of essential characteristics thereof, the present embodiment is therefore illustrated and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method for reproducing dam recorded in an optical disk as a signal obtained by modulating the data in accordance with a predetermined partial response characteristic, comprising the steps of:

reproducing a signal from the optical disk;

generating a synchronous clock signal;

obtaining a sampling value from the reproduction signal in synchronism with the synchronous clock signal;

detecting a maximum likelihood decode data on the basis of the sampling value in synchronism with the synchronous clock signal;

detecting a phase error between the synchronous clock signal and a point of time when the reproduction signal is sampled; and judging whether the detected phase error is usable for compensating a phase shift of the synchronous clock signal.

2. The method according to claim 1, wherein the phase error includes a leading-edge phase error and a trailing-edge phase error of the reproduction signal, both phase errors being independently detected and whether the respective detected phase errors are usable is independently judged.

3. The method according to claim 2, wherein whether the detected phase error is usable is judged on the basis of the polarities thereof.

4. The method according to claim 2, wherein whether the detected phase error is usable is judged on the basis of the amplitudes thereof.

5. The method according to claim 2, wherein whether the detected phase error is usable is judged on the basis of the polarities and amplitudes thereof.

6. The method according to claim 1, wherein whether the detected phase error is usable is judged on the basis of the polarity itself.

7. The method according to claim 1, wherein whether the detected phase error is usable is judged on the basis of the amplitude thereof.

8. The method according to claim 1, wherein whether the detected phase error is usable is judged on the basis of the polarity and amplitude thereof.

9. An apparatus for reproducing data recorded in an optical disk as a signal obtained by modulating the data in accordance with a predetermined partial response characteristic, comprising:

means for reproducing a signal from the optical disk;

means for generating a synchronous clock signal;

sampling means for obtaining a sampling value from the reproduction signal in synchronism with the synchronous clock signal;

maximum likelihood decoding means for detecting a maximum likelihood decode data on the basis of the sampling value in synchronism with the synchronous clock signal;

phase error detecting means for detecting a phase error between the synchronous clock signal and a point of time when the reproduction signal is sampled; and judging means for judging whether the phase error detected by said phase error detecting means is usable for compensating a phase shift of the synchronous clock signal.

10. The apparatus according to claim 9, wherein said phase error detecting means independently detects a leading-edge phase error and a trailing-edge phase error, and said judging means independently judges whether these detected phase errors are usable.

11. The apparatus according to claim 10, wherein said judging means judges whether the detected phase errors are usable on the basis of the polarities thereof.

12. The apparatus according to claim 11, wherein said judging means sets a threshold level whereby the amplitudes of the detected phase errors are recognized.

13. The apparatus according to claim 10, wherein said judging means sets a threshold level whereby the amplitudes of the detected phase errors are recognized.

14. The apparatus according to claim 9, wherein said judging means judges whether the detected phase error is usable on the basis of the polarity thereof.

15. The apparatus according to claim 14, wherein said judging means sets a threshold level whereby the amplitude of the detected phase error is recognized.

16. The apparatus according to claim 9, wherein said judging means sets a threshold level whereby the amplitude of the detected phase error is recognized.

* * * * *

UNITED STATES PATENT AND TRADEMARK OFFICE
CERTIFICATE OF CORRECTION

PATENT NO. : 5,675,565
DATED : Oct. 7, 1997
INVENTOR(S) : Taguchi et al.

Page 1 of 2

It is certified that error appears in the above-identified patent and that said Letters Patent is hereby corrected as shown below:

Column 2, line 62, between "of" and In" insert --$Z_k$.--.

Column 4, line 6, after "$C_{k\text{-}lave}$" insert --,--.

Column 7, line 3, delete "am" and insert --an-- therefor.

Column 12, line 46, delete "287" and insert --257-- therefor.

Column 14, line 31, after "unit" insert --25.--

UNITED STATES PATENT AND TRADEMARK OFFICE
CERTIFICATE OF CORRECTION

PATENT NO. : 5,675,565
DATED : Oct. 7, 1997
INVENTOR(S) : Taguchi et al.

It is certified that error appears in the above-identified patent and that said Letters Patent is hereby corrected as shown below:

Column 16, line 48, delete "dam" and insert

--data-- therefor.

Column 17, line 15, delete "itself" and insert

--thereof-- therefor.

Signed and Sealed this

Twenty-seventh Day of October, 1998

Attest:

BRUCE LEHMAN

Attesting Officer

Commissioner of Patents and Trademarks